(12) United States Patent
Squyres

(10) Patent No.: US 9,090,191 B2
(45) Date of Patent: Jul. 28, 2015

(54) SLIDING DECKING BEAM END

(71) Applicant: B2B Casuals, Inc., Quinlan, TX (US)

(72) Inventor: Jerrell P. Squyres, Point, TX (US)

(73) Assignee: B2B Casuals, Inc., Quinlan, TX (US)

( * ) Notice: Subject to any disclaimer, the term of this patent is extended or adjusted under 35 U.S.C. 154(b) by 0 days.

(21) Appl. No.: 14/522,019

(22) Filed: Oct. 23, 2014

(65) Prior Publication Data

US 2015/0110572 A1 Apr. 23, 2015

Related U.S. Application Data

(60) Provisional application No. 61/894,885, filed on Oct. 23, 2013, provisional application No. 61/969,086, filed on Mar. 21, 2014.

(51) Int. Cl.
*B60P 7/15* (2006.01)
*B60P 1/00* (2006.01)
*B61D 45/00* (2006.01)

(52) U.S. Cl.
CPC ... *B60P 1/00* (2013.01); *B60P 7/15* (2013.01); *B61D 45/00* (2013.01)

(58) Field of Classification Search
CPC .............. B60P 7/15; B60P 1/00; B61D 45/00
USPC ........... 410/89, 143, 144, 145, 146, 147, 148, 410/149, 150
See application file for complete search history.

(56) References Cited

U.S. PATENT DOCUMENTS

| 5,338,137 | A | 8/1994 | Jensen |
| 6,074,143 | A | 6/2000 | Langston et al. |
| 6,364,583 | B1 | 4/2002 | Koller |
| 6,895,867 | B1 | 5/2005 | Burrows |
| 8,172,494 | B1 | 5/2012 | Knox |
| 8,740,526 | B2 | 6/2014 | Knox |
| 8,757,944 | B2 | 6/2014 | Calico |
| 8,820,008 | B2 | 9/2014 | Knox |
| 2008/0131227 | A1* | 6/2008 | Maresh et al. ................ 410/145 |

* cited by examiner

*Primary Examiner* — Stephen Gordon
(74) *Attorney, Agent, or Firm* — Ross Joyner PLLC; Christopher P. O'Hagan

(57) ABSTRACT

The present invention provides an end assembly for use with cargo decking beams. The end assembly comprises a body that is slidably disposed within the end of a decking beam. A foot section is pivotally coupled to the body and includes obliquely angled guide edges formed from outer plates of the foot. The guide edges are slidably captured within similarly angled guide channels in a mounting track. A pivoting locking plate sandwiched between said outer plates slides into and out of openings (either A or E slots) in the mounting track to secure the beam end assembly in place.

8 Claims, 29 Drawing Sheets

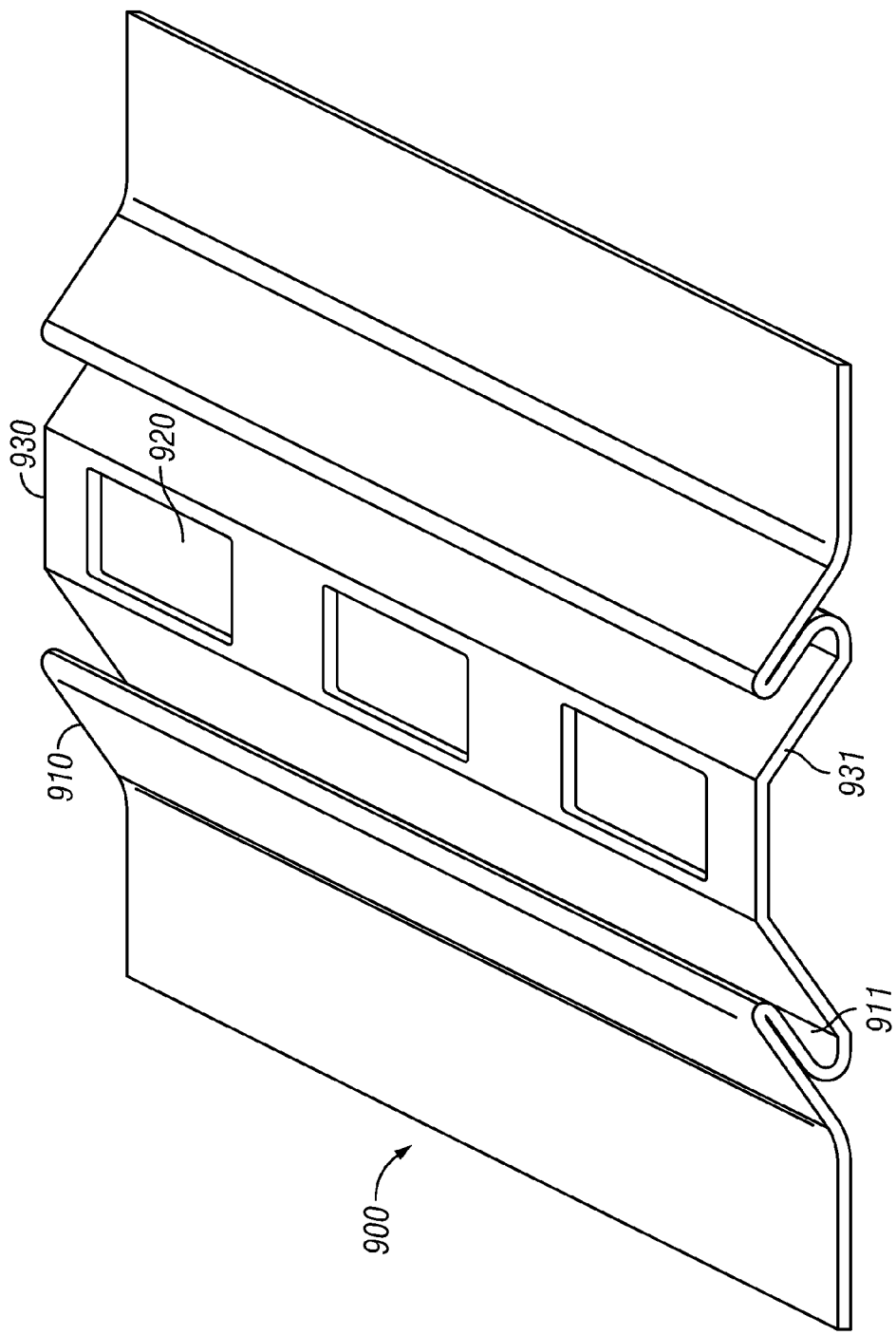

SLIDING DECKING BEAM END

CROSS-REFERENCE TO RELATED APPLICATIONS

This application claims the benefit of and priority to U.S. Provisional Patent Application No. 61/894,885, filed 23 Oct. 2013, and U.S. Provisional Patent Application No. 61/969,086, filed 21 Mar. 2014 the technical disclosures of which are hereby incorporated herein by reference.

This application is also related to co-pending application Ser. No. 14/521,946 entitled "Cargo Decking Beam System," filed 23 Oct. 2014.

TECHNICAL FIELD

The present invention relates generally to the field of cargo containers and more specifically to a system of adjustable load beams that provide decking to divide the cargo container into multiple levels of payload.

BACKGROUND OF THE INVENTION

In freight transportation it is often desirable to stack cargo in multiple levels to take full advantage of the available height of containers such as truck trailers, aircraft, railroad cars, and other similar cargo containers. To facilitate this process it is common practice to employ removable decking beams capable of supporting the weight of heavy payloads.

Typically such decking beams are adjustable, allowing them to be repositioned within a cargo container at various heights and horizontal intervals, depending on the size and nature of the cargo.

FIG. 1 illustrates a typical cargo beam and decking system in accordance with the prior art. FIG. 1 is a cut-away perspective view of a truck trailer containing two rows and stacks of cargo pallets. As shown, a series of vertical mounting tracks 10 line the walls along the length of the cargo container. Each of the mounting tracks 10 includes a series of openings for adjusting the height of the decking beams. In the present example four decking beams 20 span the width of the trailer, providing support for the top layer of cargo pallets 30.

FIG. 2 is a side view of an adjustable decking beam in accordance with the prior art. The beam 40 comprises a central section 50 that is hollow and two adjustable end pieces 60, 70 that are slidably disposed within the ends of the beam. Each end piece further comprises a "foot" 65, 75 that can be slidably disposed along the vertical mounting tracks shown in FIG. 1.

The feet have trigger, locking mechanisms 80 that engage and disengage with the openings in the mounting tracks, thereby allowing the beams to be locked into place at different heights, according to the needs of the user.

Several problems arise with the current designs of decking beams. In the event one end of the beam is dropped to the floor, the opposite end often damages the vertical mounting track.

In addition, most current models support the beam with two outside pieces with the trigger mechanism enclosed in the middle. However, once the outside pieces are bent, the enclosed trigger mechanism becomes inoperative, and the beam is out of service. Similarly, some prior art designs use outside trigger mechanism, which encounter the same problem. They are easily bent, putting the whole beam out of service.

Another common problem with prior art decking beams is the possibility of the beam being dented or bent during the loading/unloading process. One approach for addressing this problem involves increasing the width of the top surface of the beam relative to the bottom.

FIGS. 3 and 4 are cross sectional views of different prior art designs for decking beams with wider top widths than bottom widths. The increased top width increases the area over which the load of the cargo is distributed, reducing potential damage to the cargo due to cutting by the beam. The extended top width also provides additional structural strength to prevent the side surface from bending in case cargo impacts the side of the beam during loading. In both examples, the wide-top beams have a general T-shape.

In the example shown in FIG. 3, the extended edges form hollow, square, box-like structures 90, 100 perpendicular to the main body 101 of the beam. In FIG. 4, the extended edges 110, 111 are cantilevered from the main body of the beam as shown. Unfortunately, the geometric configurations of these prior art designs make the extended edges of the beam tops vulnerable to structural damage.

Therefore, there is a need in the freight industry for a more robust decking beam system that is more resilient to damage from the often rough conditions of loading and unloading heavy cargo.

SUMMARY OF THE INVENTION

The present invention provides an adjustable decking system for use in a cargo container. The decking apparatus comprises at least one pair of vertical mounting posts configured to be attached on the interior walls of a cargo container. The mounting posts have a plurality of spaced openings and a capture slider track that forms obliquely angled guide channels. The system includes at least one decking beam configured to support cargo loads. The decking beam further comprises end assemblies slidably disposed within opposite ends of the beam and configured to attach the beam member to the mounting posts, wherein the decking beam is selectively adjustable in height along the mounting posts. There are two alternative configurations for the end assemblies, both of which are accommodated by the mounting post.

The first end assembly configuration comprises a foot section pivotally coupled to a beam end body. The foot includes obliquely angled guide edges that are slidably captured within the guide channels in the slider track, and an internal locking plate that slides into and out of the openings by means of a locking arm coupled to the locking plate.

The second alternative end assembly configuration comprises is a reversible end assembly with identical latch mechanisms at both ends of the assembly. The end assembly is formed from two C-shaped plates coupled back-to-back. At both ends the plates are shaped into a tab that fit into the openings in the mounting track. The tab has a retaining lip formed on the bottom to engage the mounting post when inserted through the openings and a notch in the top surface that provides room for the retaining lip to be inserted into and lifted out of the openings. An internal swivel latch sandwiched between the plates fills the vertical space left by the notch when in a closed position, thereby providing a retaining force to prevent the retaining lip from lifting out of the openings.

The spaced openings in the mounting posts are either industry standard "A" or "E" slots, making the mounting posts compatible with off-the-shelf beams and straps in addition to the beam end assemblies of the present invention.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 20 is a perspective view of an alternate embodiment of the captive mounting post in accordance with the present invention;

DETAILED DESCRIPTION OF THE DRAWINGS

The present invention provides an adjustable cargo decking beam system that is very resistant to damage from impact by heavy cargo loads and can be replaced in modular fashion in the unlikely event of such damage, thereby reducing operating costs.

Figure 5:
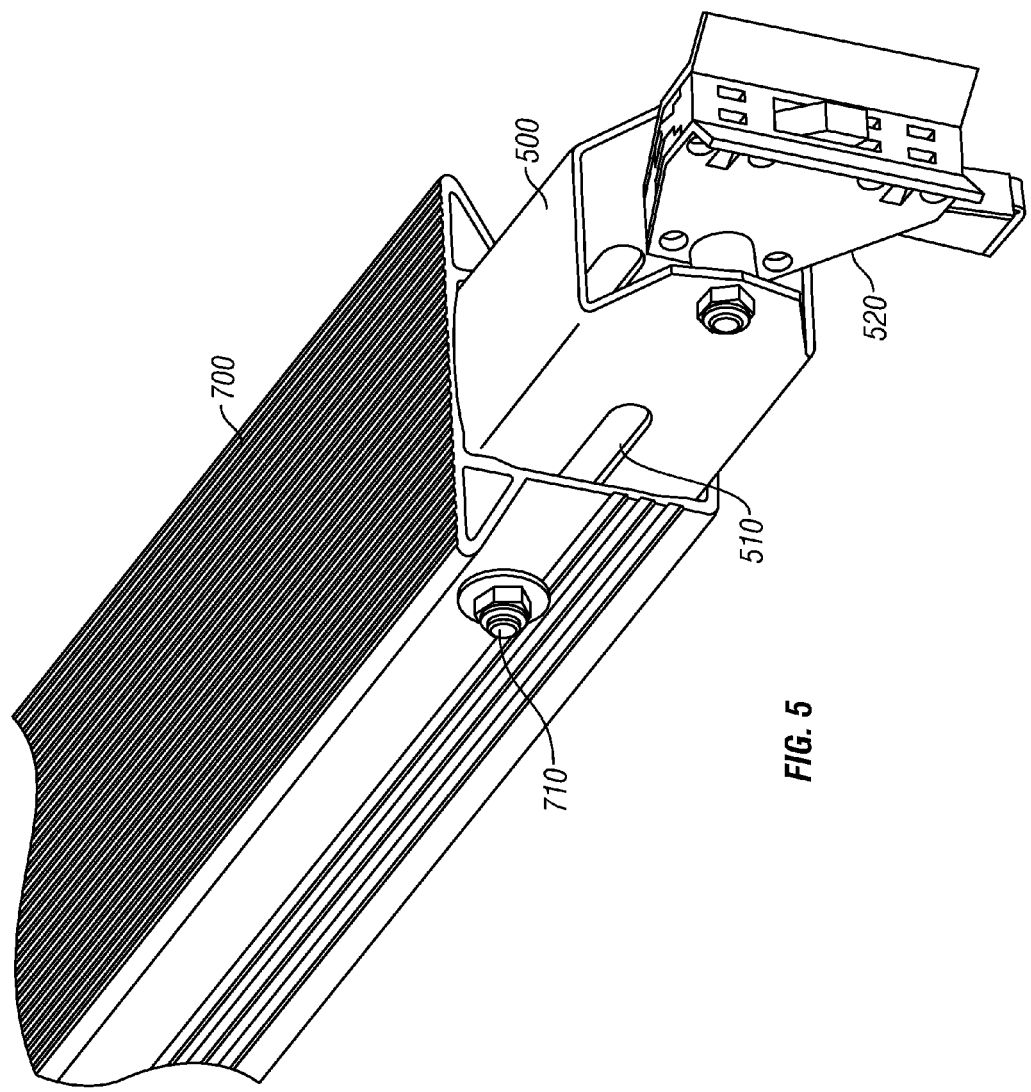
FIG. 5 is a perspective view of an adjustable decking beam in accordance with an embodiment of the present invention.

Referring now to FIG. 5, a perspective view of an adjustable decking beam is shown in accordance with an embodiment of the present invention. The beam end body 500 slidably inserts into the opening at the end of the decking beam member 700 as shown. An identical beam end (no shown) is inserted at the opposite end of the beam 700. In this particular example, the beam member 700 has a wide top configuration (explained in more detail below), but it should be emphasized the beam end 500 is compatible with other types of decking beams.

Elongated slots 510 on either side of the beam end 500 allow the position of the beam end to be telescopically adjusted. A retaining bolt 710 extends through the sides of the decking beam 700 (see also FIGS. 31 and 32) and is slidably disposed within the slots 510 of the beam end 500. The beam 700 is mounted by means of the "foot" 520 that is pivotally coupled to the beam end 500 as shown.

Figure 6:
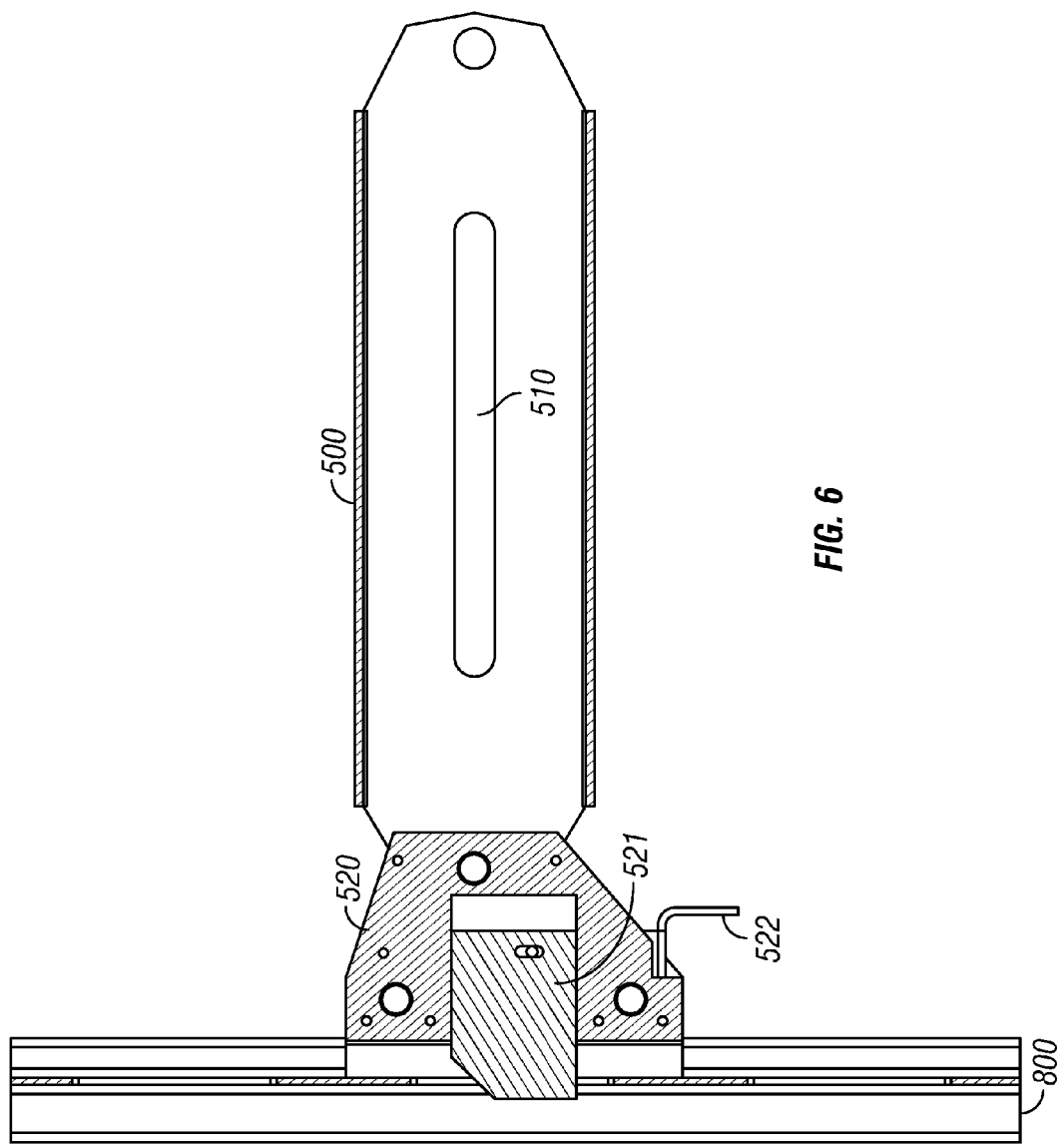
FIG. 6 is a side cross-section view of the sliding end piece of a decking beam in accordance with the present invention.

FIG. 6 is a side cross-section view of the sliding end piece of a decking beam in accordance with the present invention. In this figure, the sliding beam end 500 is shown in isolation without the decking beam. The cross section better illustrates the pivoting locking plate 521 in the center of the "foot" 520 of the beam end. This locking plate 520 engages openings in the mounting post 800 to secure the beam in place.

Figure 7:
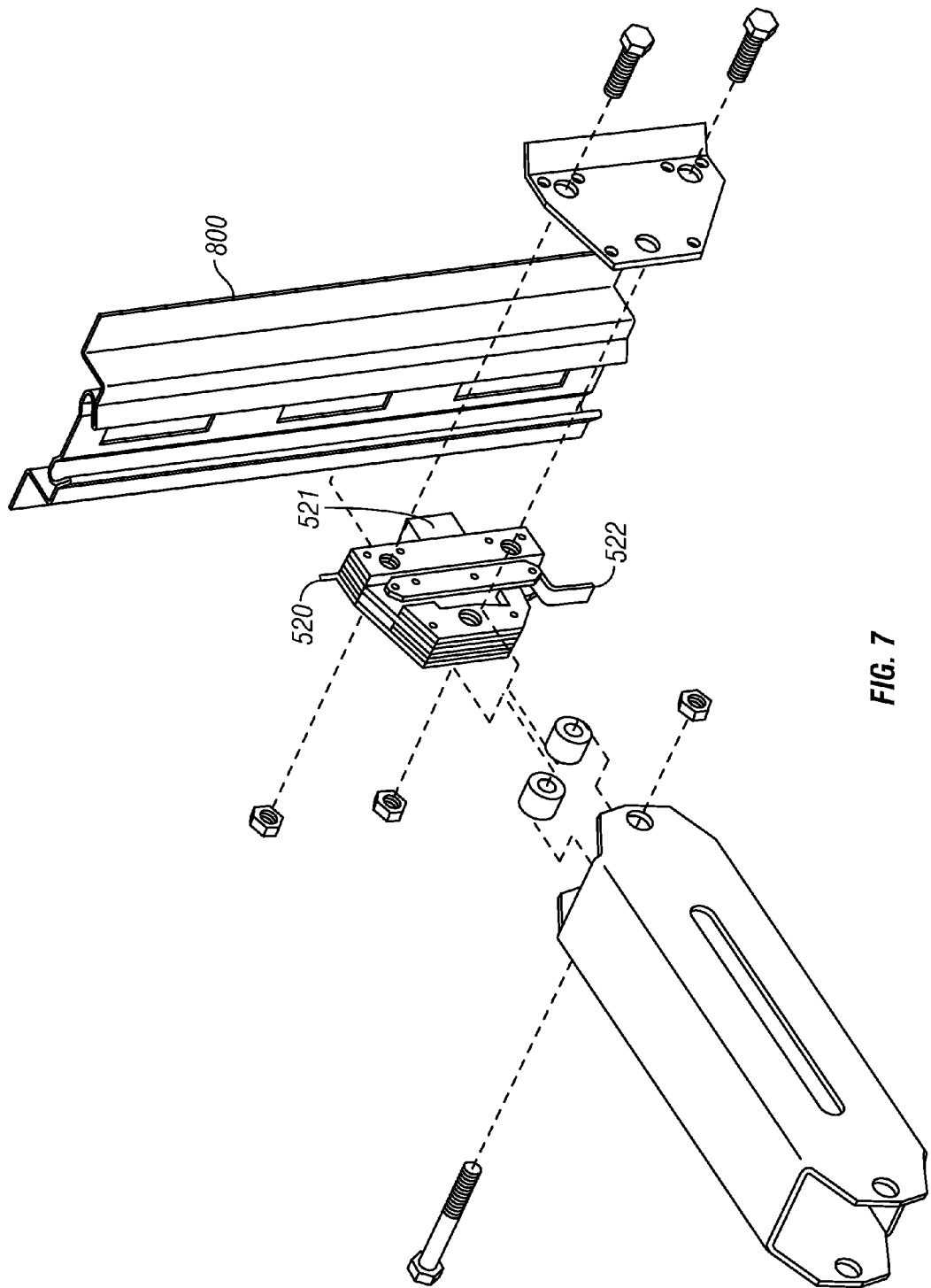
FIG. 7 is an exploded view of the sliding end of a decking beam in accordance with the present invention.

FIG. 7 is an exploded view of the sliding end of a decking beam in accordance with the present invention. In this view, one can better see the locking arm 522 inside the foot 520 that moves the locking plate 521 in and out of the retaining slots in the mounting post 800.

Figure 8:
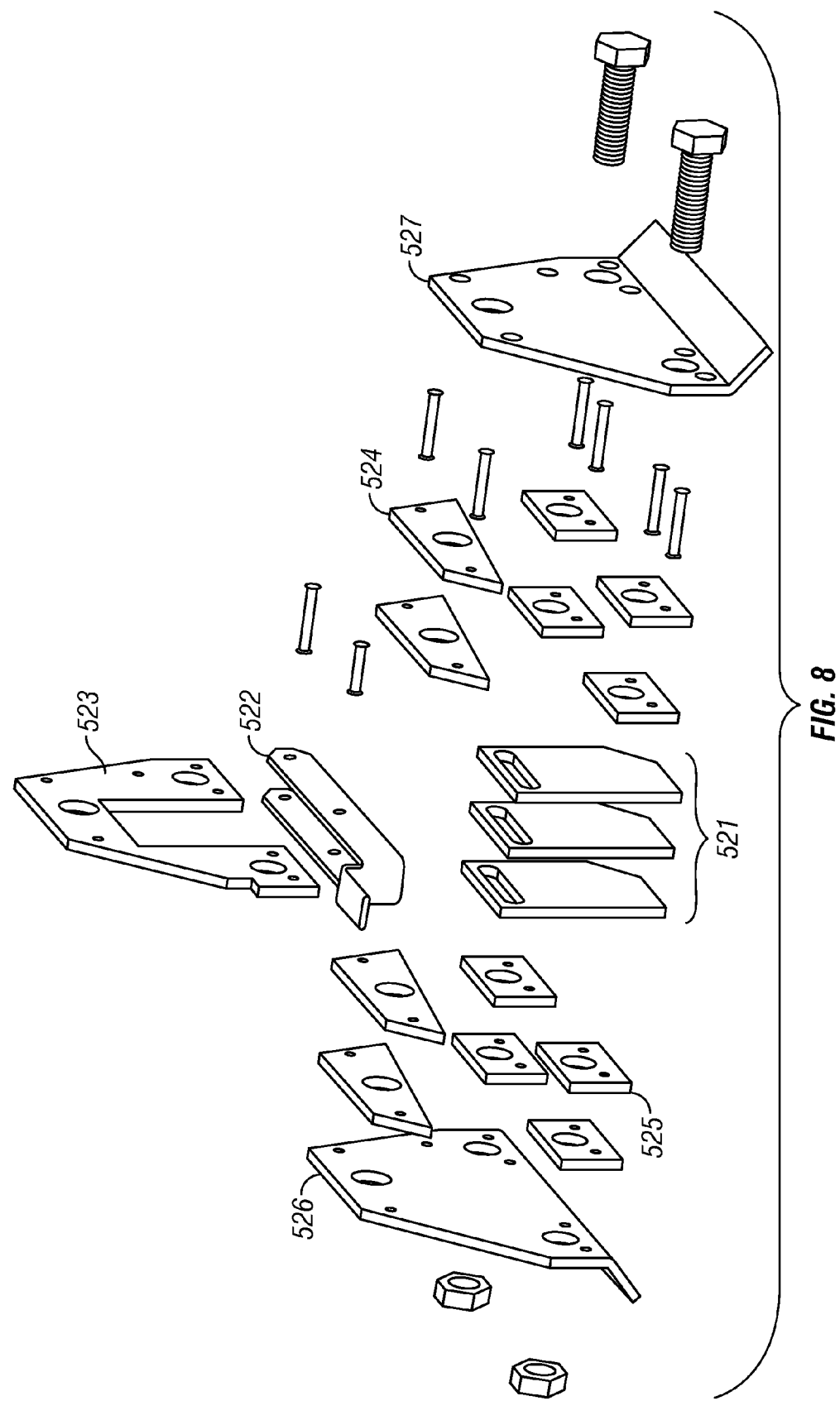
FIG. 8 is an exploded view of the foot section of a decking beam in accordance with the present invention.
Figure 9:
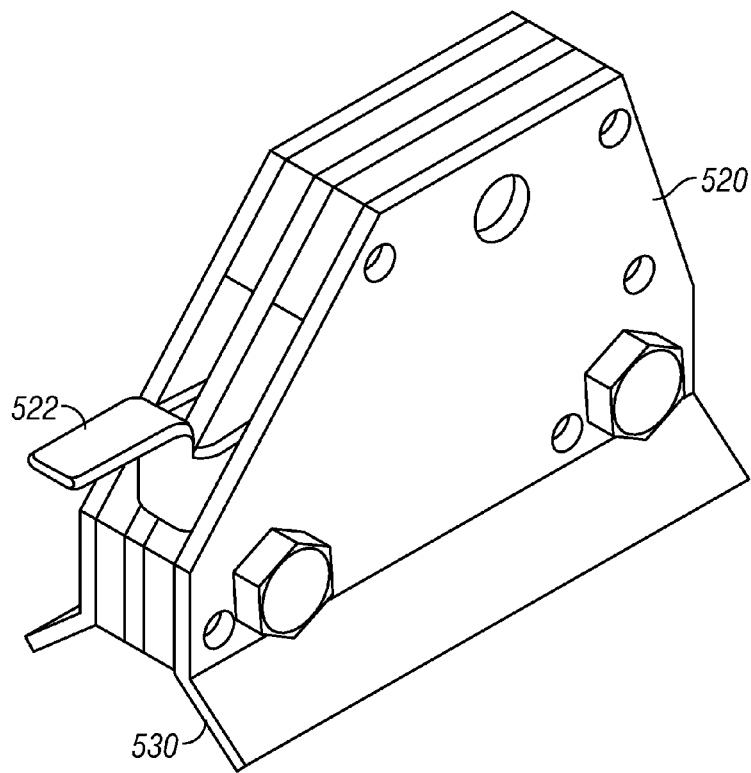
FIG. 9 is a perspective view of an assembled foot section in accordance with the present invention.

FIGS. 8-11 show the foot section of the beam end in greater detail. FIG. 8 is an exploded view of the foot section of a decking beam in accordance with the present invention. FIG. 9 is a perspective view of an assembled foot section. The U-shaped locking arm 522 flanks the side of the center locking plate 521, which itself comprises three plates in this particular example. The center plate 523 has a recess to accommodate the locking plate. The upper and lower spacer plates 524, 525 between the outer plates 526, 527 and the center plate 523 define the movement path of the pivot lever 521 as well as provide mechanical reinforcement to protect the operation of the locking arm and locking plate.

Figure 10:
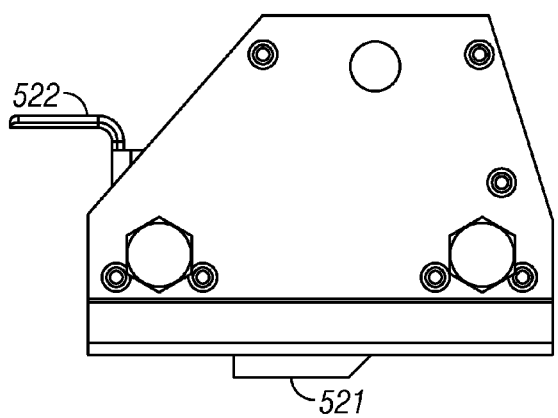
FIG. 10 is a side view of the foot section in accordance with the present invention.
Figure 11:
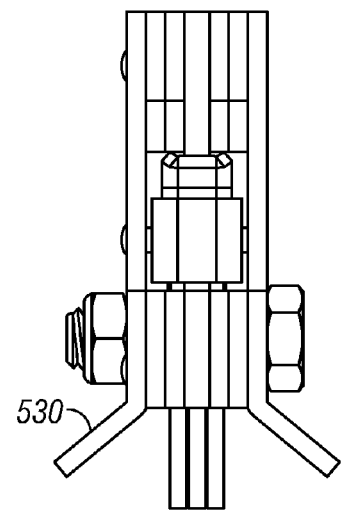
FIG. 11 is a front view of the foot section in accordance with the present invention.

FIG. 10 is a side view of the foot section. FIG. 11 shows a front view of the foot section. The front view illustrates how the layered spacer plates between the outer plates and the center plate provide mechanical reinforcement to protect the operation of the locking arm 522 and locking plate 521, which is securely sandwiched between the outer plates. FIG. 11 also clearly shows the outward, obliquely angled guide edges 530 formed from the outer plates that track within the mounting post guide channels (see FIG. 18).

In addition to the mechanical strength provided by its design, in a preferred embodiment of the beam end, the foot 520 is constructed from steel. In contrast, most foot sections in prior art beam systems are made of aluminum, making them more vulnerable to damage.

Figure 12:
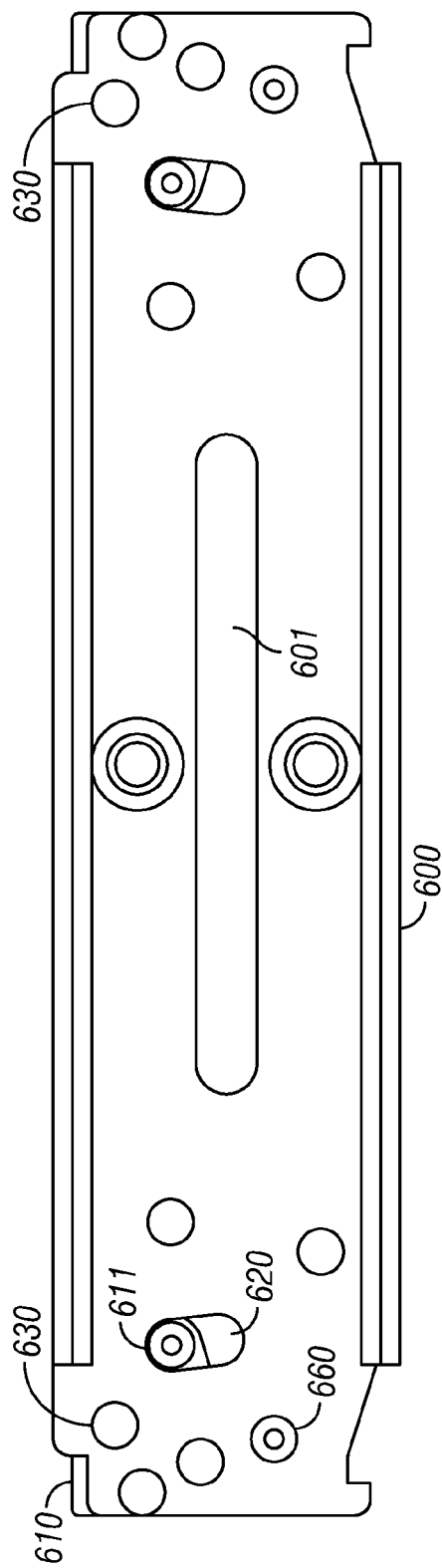
FIG. 12 is a side view of a reversible beam end in accordance with an alternate embodiment of the present invention.

FIG. 12 is a side view of a reversible beam end 600 in accordance with an alternate embodiment of the present invention. It is sometimes referred to as a replacement channel assembly, beam head assembly, decking beam head, e beam end plug or simply the end piece. In one embodiment, the beam end comprises a steel insert that fits into an aluminum extrusion to complete the e beam, which locks into an e track on the side wall of a trailer or truck body (described below).

Like the beam end embodiment described above, the reversible beam 600 is also telescopically disposed within the ends of a decking beam, employing adjustment slots 601. However, in this alternate embodiment of the adjustable beam end there is no separate foot section. The latch mechanism comprises a tab formed from the back-to-back coupled plates 640, 650, which inserts directly into the openings in the mounting post (see FIG. 23). The swivel latch 610 mounted on the tab is operated by means of a pull handle 611 that extends through a slot 620 in the beam plate as shown. The latch can be locked in place by means of bullet lock holes 630 in the latch and beam plates that align when the latch is in the closed position (see FIG. 14).

The great advantage of this embodiment is that both ends have identical latch mechanisms. In the even that the latch mechanism becomes damaged the user can simply remove the beam end from the decking beam and reinsert it in reverse and use the opposite end.

Figure 13:
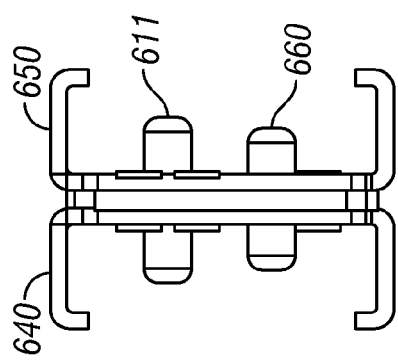
FIG. 13 is an end-on view of the reversible beam end in accordance with the present invention.

FIG. 13 is an end-on view of the reversible beam end. A shown, in this embodiment two C-shaped beam plates 640, 650 are coupled back-to-back for increased mechanical reinforcement. The extension of track stops 660 from the center of the beam end control the depth of insertion into the slider post (see FIG. 19).

Figure 14:
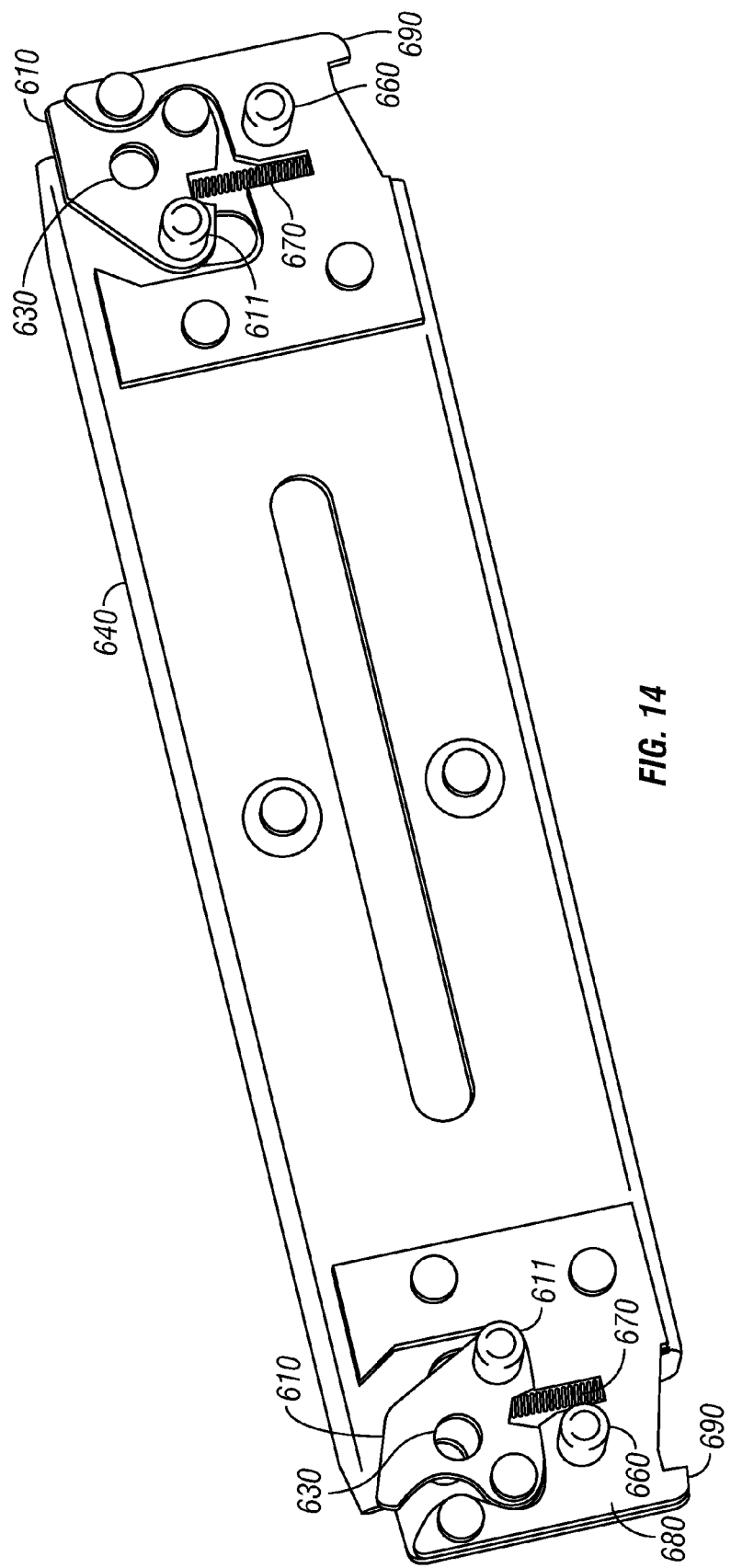
FIG. 14 is a side, cross-section view of the reversible beam end in accordance with the present invention.

FIG. 14 is a side, cross-section view of the reversible beam end in accordance with the present invention. This view more clearly shows the swivel latch 610 on the end tab that is sandwiched between the plates 640, 650. The left side of the beam end illustrates the latch mechanism in the open position, while the right side shows the latch in the closed position. By default the swivel latch 610 is held in the closed position by a return spring 670 recessed into the spacer plate 680. The spacer plate 680 defines the path of movement of the swivel latch 610 as shown.

Figure 23:
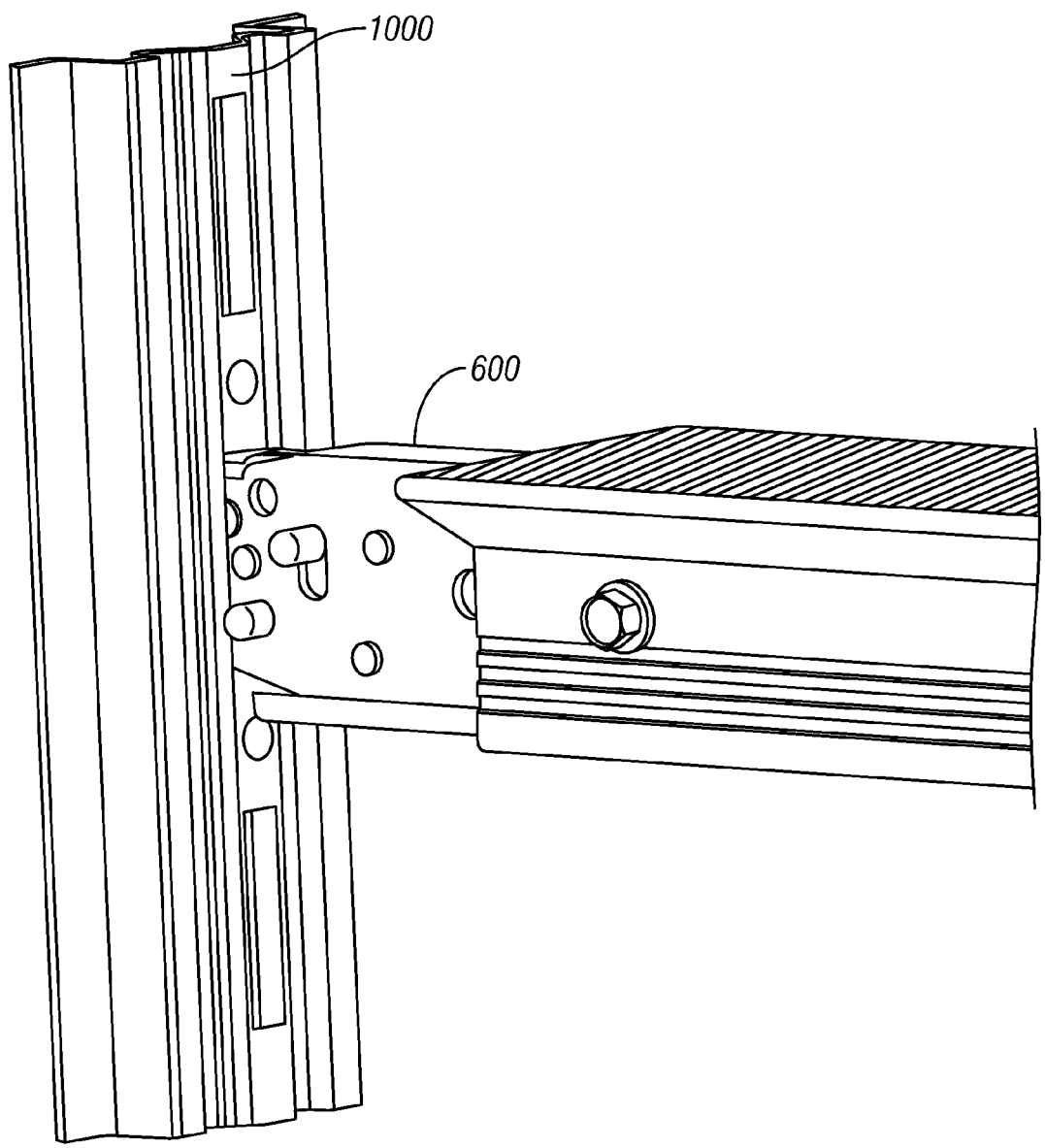
FIG. 23 is a perspective view of the reversible beam end inserted into the captive mounting post insert in accordance with the present invention.

In the closed position, the beam end is held within an opening of the mounting post by means of a fixed lower retaining lip 690 formed at the bottom of the end tab and the swivel latch 610 at the top (see FIG. 23). As shown, the spacing plate 680 of in the latch mechanism is also shaped to form part of the fixed retaining lip 690.

To open the latch, the user depressed the pull handle 611, compressing the return spring 670. As shown on the left side of FIG. 14, when the pull handle 611 is depressed and the swivel latch 610 pulled into the open position a space is created at the top edge of the beam end, creating space to lift the lower retaining lip 690 up and out of the mounting post.

As shown on the right side of the beam end, when the latch is in the closed position the bullet lock holes 630 in the beam plate 640 and swivel latch 610 align, allowing a lock to be inserted to secure the latch.

Figure 15:
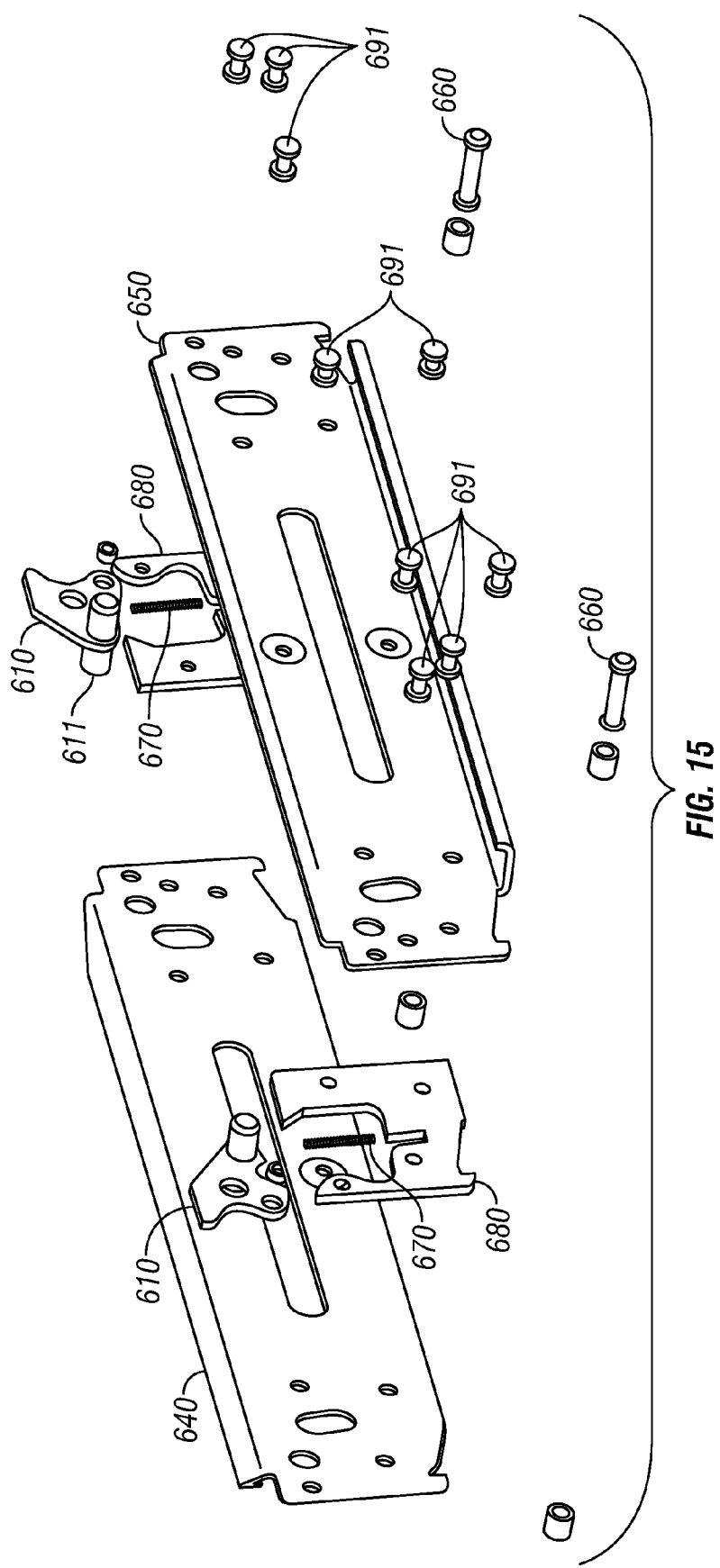
FIG. 15 is an exploded view of the reversible beam end in accordance with the present invention.

FIG. 15 is an exploded view of the reversible beam end in accordance with the present invention. In this example, the components of the reversible beam end are held together by flat head rivets 691 as shown.

Figure 1:
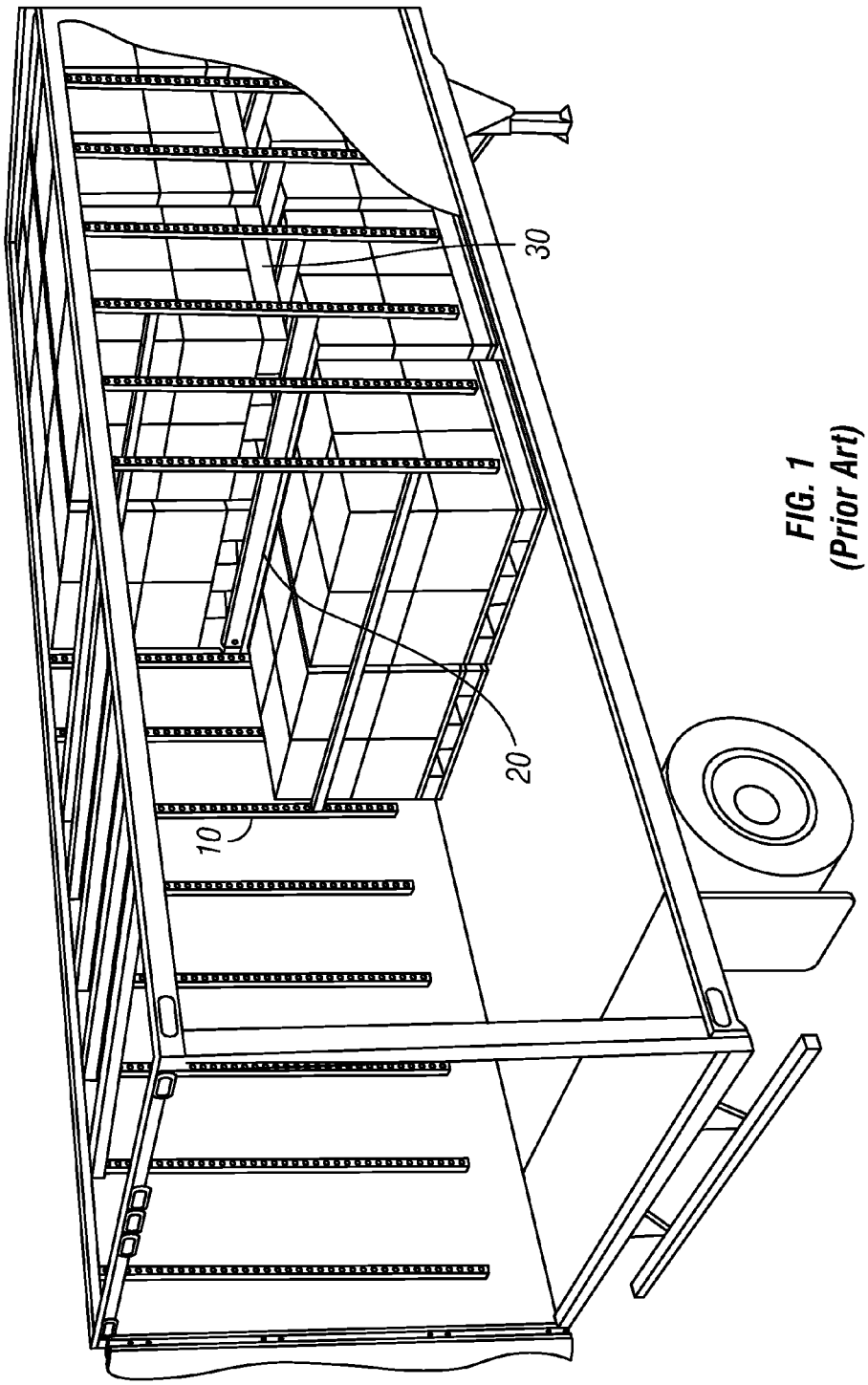
FIG. 1 is a cut-away perspective view of a truck trailer employing a cargo beam and decking system in accordance with the prior art.
Figure 2:
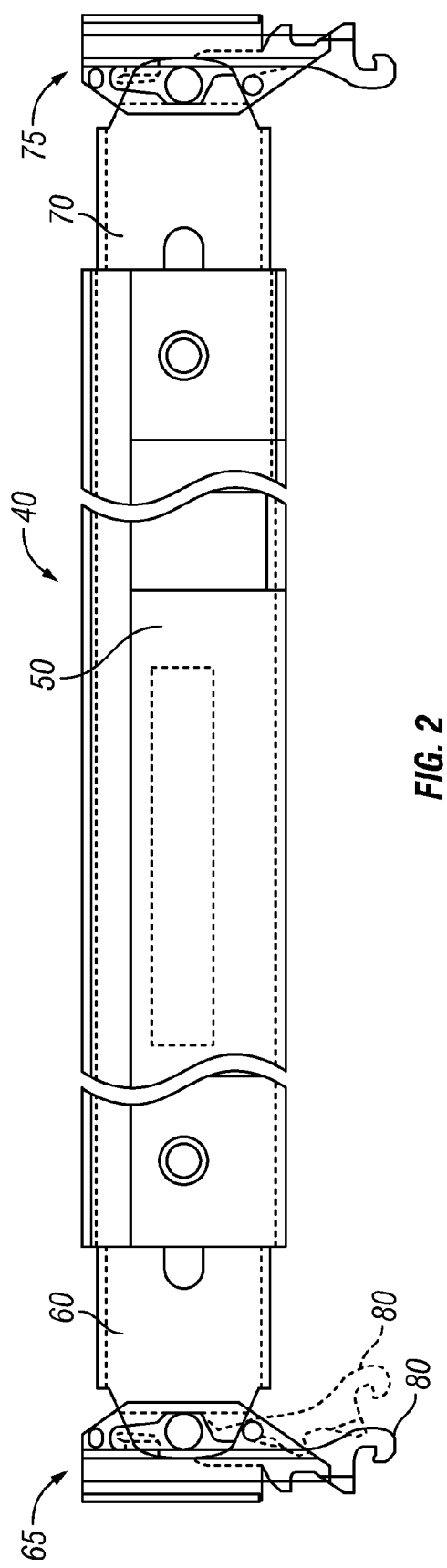
FIG. 2 is a side view of an adjustable decking beam in accordance with the prior art.
Figure 16:
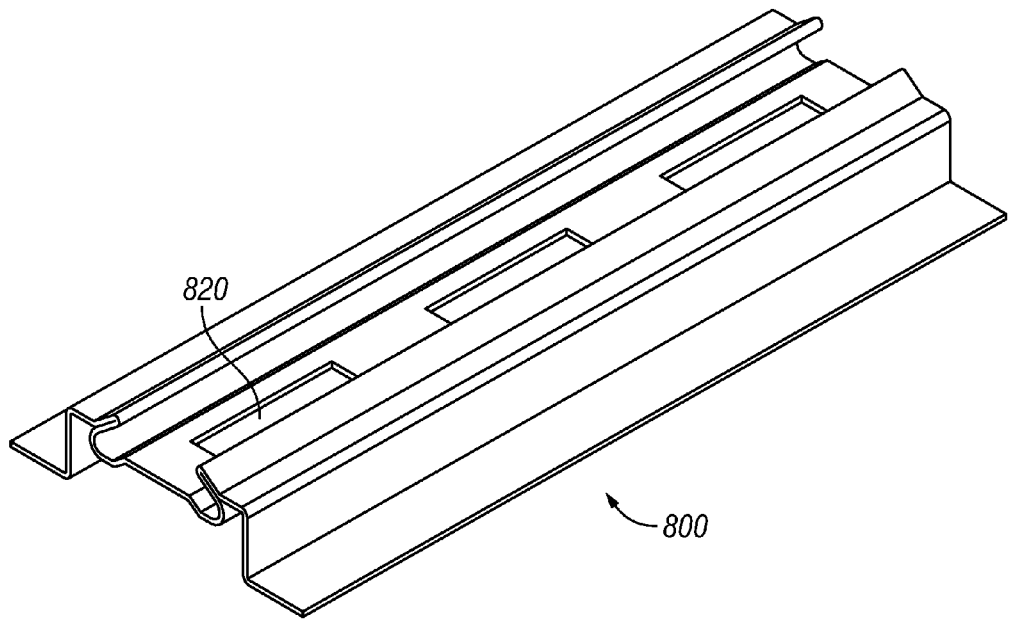
FIG. 16 is a perspective view of a captive mounting post in accordance with an embodiment of the present invention.
Figure 17:
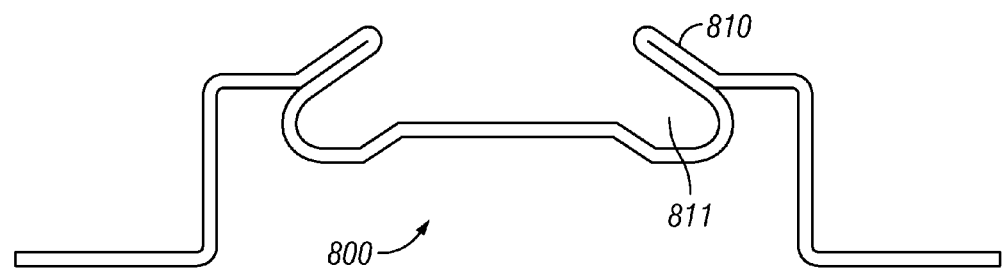
FIG. 17 is a top, cross-section view of the captive mounting post in accordance with the present invention.

FIG. 16 is a perspective view of a captive mounting post in accordance with an embodiment of the present invention. FIG. 17 is a top, cross-section view of the mounting post. Such posts would be mounted on opposite sides of the cargo container at regular intervals in a manner similar to that shown in FIG. 1. The mounting post 800 comprises a slider track with obliquely (non-orthogonally) angled retaining walls 810 that form symmetrical, obliquely-angled capture guide channels 811 within which the foot section 520 of the beam end 500 can track.

In the example shown in FIG. 16, the mounting post has a row of spaced openings 820 along its length in the form of "A" slots, a standard configuration used in shipping and freight industry. More specifically, the industry standard for an A slot is a rectangular opening with dimensions of approximately 5"×1.25" (12.7 cm×3.18 cm).

Figure 34:
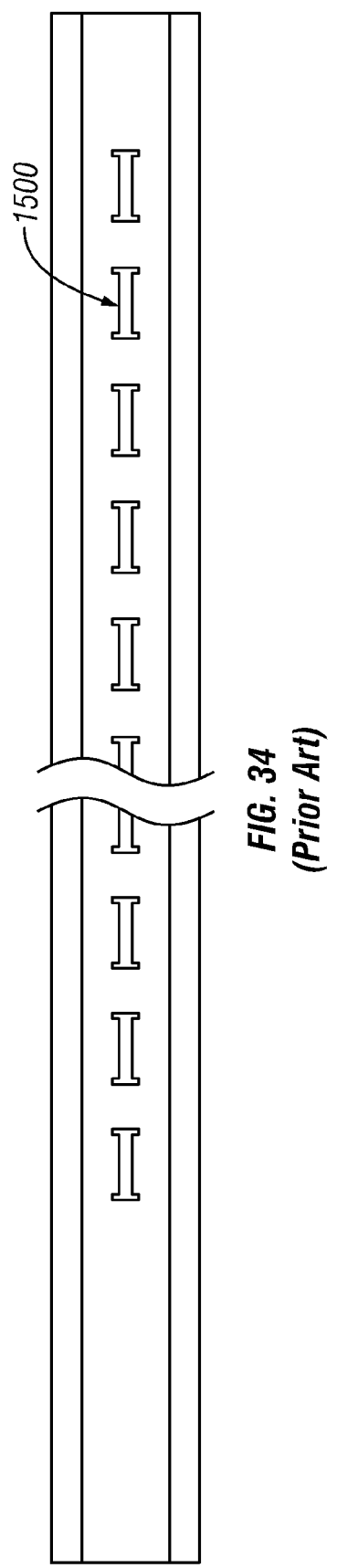
FIG. 34 is front view of a mounting post with industry standard E slots in accordance with the prior art.
Figure 35:
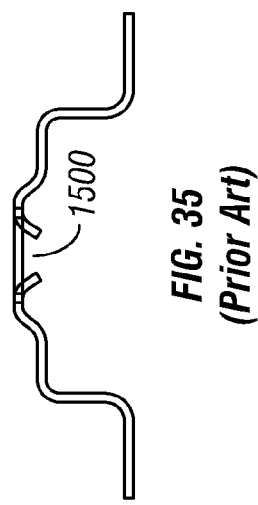
FIG. 35 is a top, cross-section view of an E slot in accordance with the prior art.

An alternative industry standard slot is the "E" slot shown in FIGS. 34 and 35. As shown in the figures, the E slot 1500 has a roughly "dog bone" shape to it. The industry standard for the dimensions of an E slot is approximately 2.41" (6.12 cm) length, 0.5" (1.27 cm) narrow center width, and 0.56" (1.42 cm) end width. The majority of logistic posts used in the shipping industry today employ the A slot configuration, however E slots are not uncommon.

For ease and economy of illustration all of the example embodiments of the present invention are illustrated using A slots. However, it should be emphasized that all embodiments of the present invention can be implemented just as easily with E slots in the mounting posts and slider tracks. Furthermore, both of the alternative beam end embodiments 500 and 600 are compatible with both "A" and "E" slots without any modification.

The mounting post of the present invention is a unique design that has a multi-use feature. Conventional side posts for trailers, truck bodies, or containers have different configurations to be used as a support member of the "box" regardless of its use. Typically, prior art logistic side posts have A or E slots punched into the post so that E beams or straps may be used to connect to the side post. Additionally, vertical or horizontal A or E slots might be used in conjunction with the logistic post.

The mounting post of the present invention provides a slider feature in addition to the standard logistic post. The slider track is configured for a "slider" or beam channel assembly such as sliding beam end 500 that when attached to a beam becomes a slidably adjustable decking system. Prior art systems must insert their own additional track into a hat-shaped side post to accommodate their adjustable deck or captive beam system. The present invention is unique in that with the logistic/slider post, no additional track is required.

In a preferred embodiment of the present invention, the mounting post is made of steel making it stronger and less vulnerable to damage than prior art logistic posts, which are typically made of aluminum.

Figure 18:
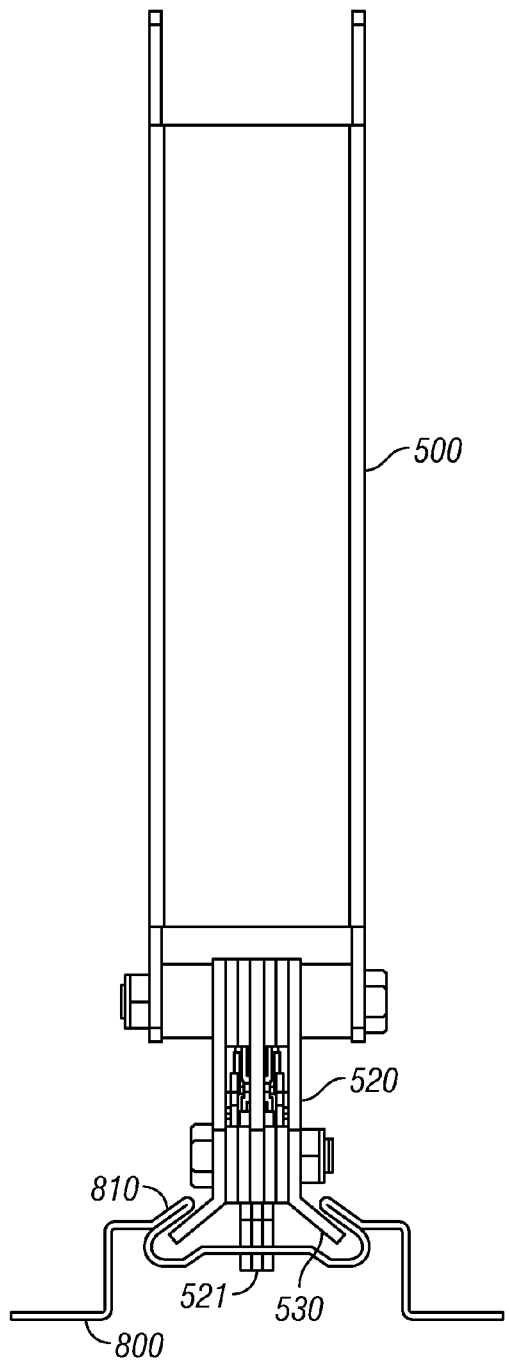
FIG. 18 is a top, cross-section view of the foot section of a sliding beam end inserted into the captive mounting post in accordance with the present invention.

FIG. 18 is a top, cross-section view a sliding beam end 500 inserted into the captive mounting post 800 in accordance with the present invention. In this embodiment of the invention, the obliquely angled retaining walls 810 of the slider track are angled inward at an angle parallel to the outward angled guide edges 530 of the foot section 520, allowing the foot to fit slidably within the guide channels.

Referring back to FIG. 16, the locking plate 521 of the foot section inserts into the A slot openings 820 to secure the beam end place, as shown in FIG. 18. Referring back to FIG. 6, the cross-section view also shows the locking plate 521 inserted into the mounting post 800. Again, it should be emphasized that the locking plate 521 can also fit into an industry standard E slot as well without any modification.

When the locking plate 521 is secured in an opening 820 in the mounting post 800, the guide edges 530 of the foot are pushed back against the angled retaining walls 810 of the mounting post, thereby applying additional retaining force to secure the beam end in place.

The captive mounting post design of the present invention is also compatible with the reversible beam end.

Figure 19:
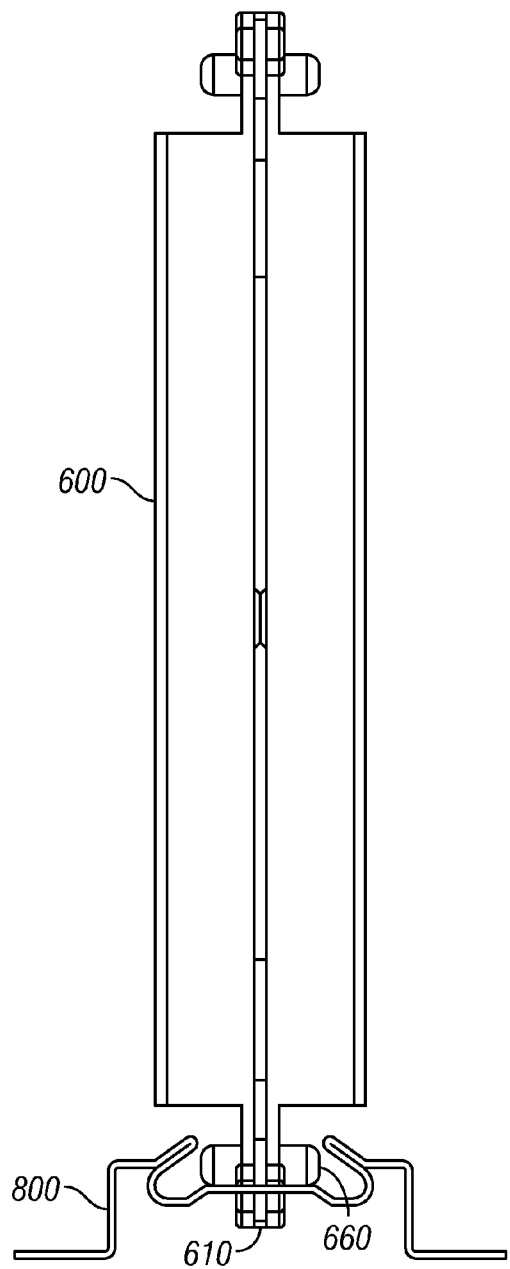
FIG. 19 is a top, cross-section view of a reversible beam end inserted into the mounting post in accordance with an alternate embodiment of the present invention.

FIG. 19 is a top, cross-section view of a reversible beam end 600 inserted into the mounting post 800 in accordance with an alternate embodiment of the present invention. The latch 610 of the reversible beam end fits into the openings (either A or E slots) in the center track of the mounting post (see also FIG. 23). As illustrated in FIG. 19, the track stops 660 extending outward from the beam plates control the depth of the insertion of the beam end into the openings in the mounting post 800. Additionally, the track stops 660 provide an opposing retaining force on the front side of the mounting post while the retaining lip of the latch mechanism provides a retaining force on the back side of the mounting post.

FIG. 20 is a perspective view of an alternate embodiment of the captive slider post in accordance with the present invention. Like the embodiment shown in FIGS. 16 and 17, this embodiment includes angled retaining walls 910 that form obliquely angled guide channels 911. However, the embodiment shown in FIG. 20 also includes an elevated center track 930 that is approximately even with the edges of the angled retaining walls 910.

This elevated center track 930 also comprises obliquely angled sides 931 that run parallel to the outer retaining walls 910, forming deeper guide channels 911 that conform more closely to the foot of the beam end than the embodiment shown in FIGS. 16-18. The elevated center track 930 also brings the openings 920 closer to the foot section, allowing the locking plate to fit deeper into the openings.

Figure 21A:
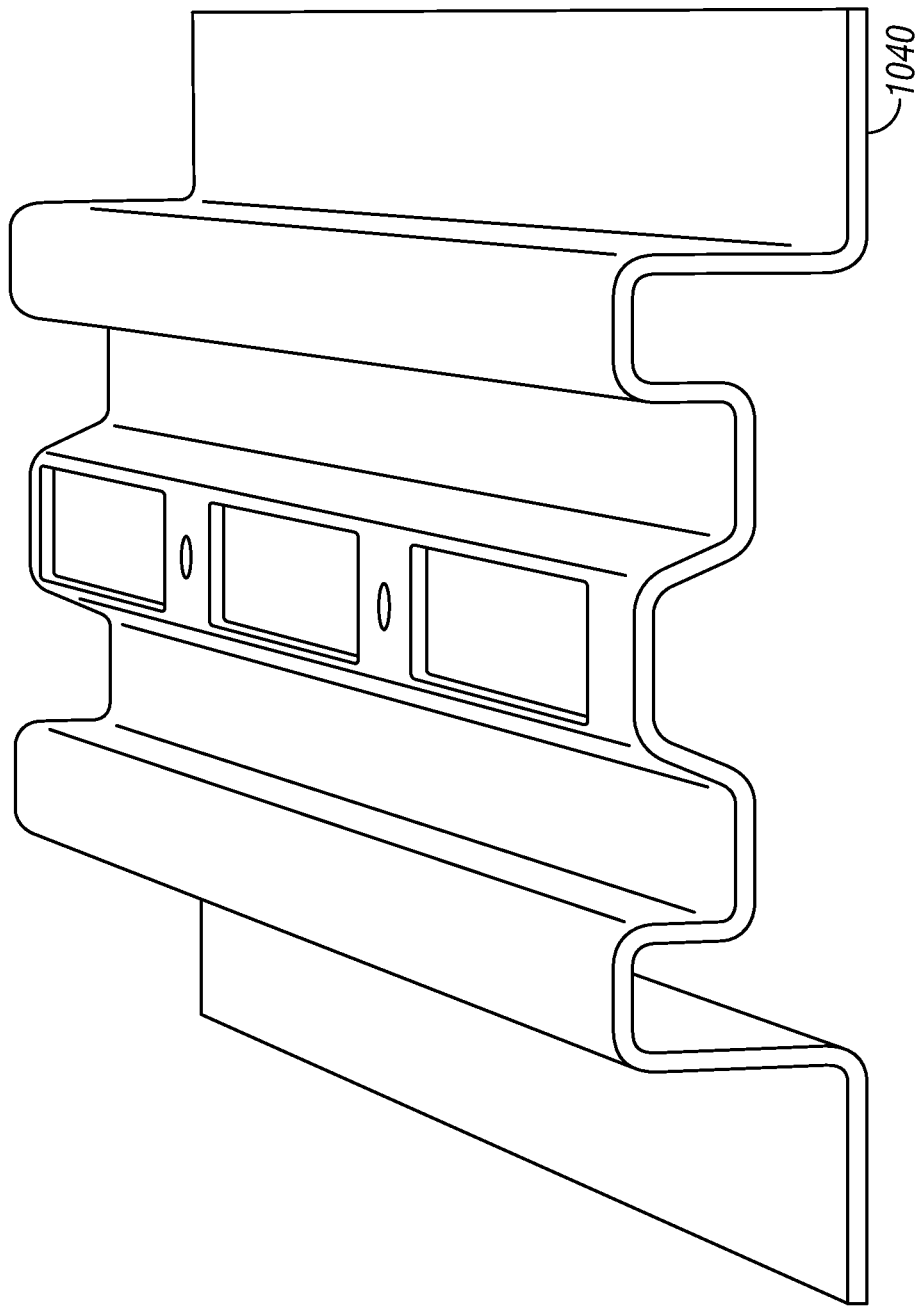
FIG. 21A is a perspective view of a mounting post without the slider track.
Figure 21B:
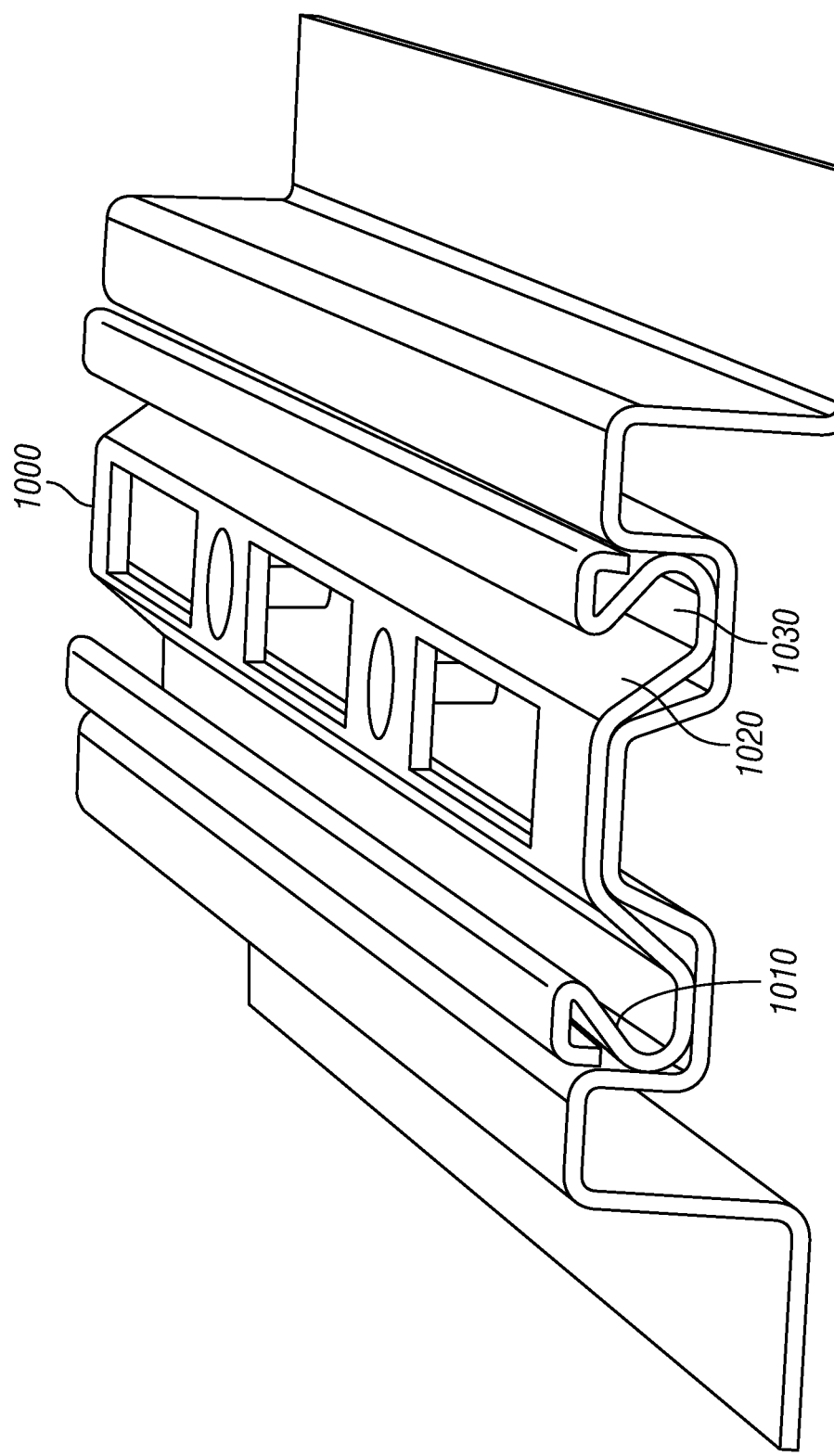
FIG. 21B shows an insert for a captive mounting post in accordance with the present invention.

FIG. 21A is a perspective view of a mounting post 1040 without the slider track. It lacks the angled retaining walls that form guide channels to secure the beam end in place. FIG. 21B shows a retrofit insert 1000 for a captive slider track in accordance with the present invention. The insert 1000 fits into the central track of the mounting post and provides angled outer retaining walls 1010 and parallel angled sides 1020 for the center track, thereby forming guide channels 1030 for the beam end. The insert 1000 is thus able to replicate the slider track cross-section of the mounting post 900 depicted in FIG. 20.

Figure 22:
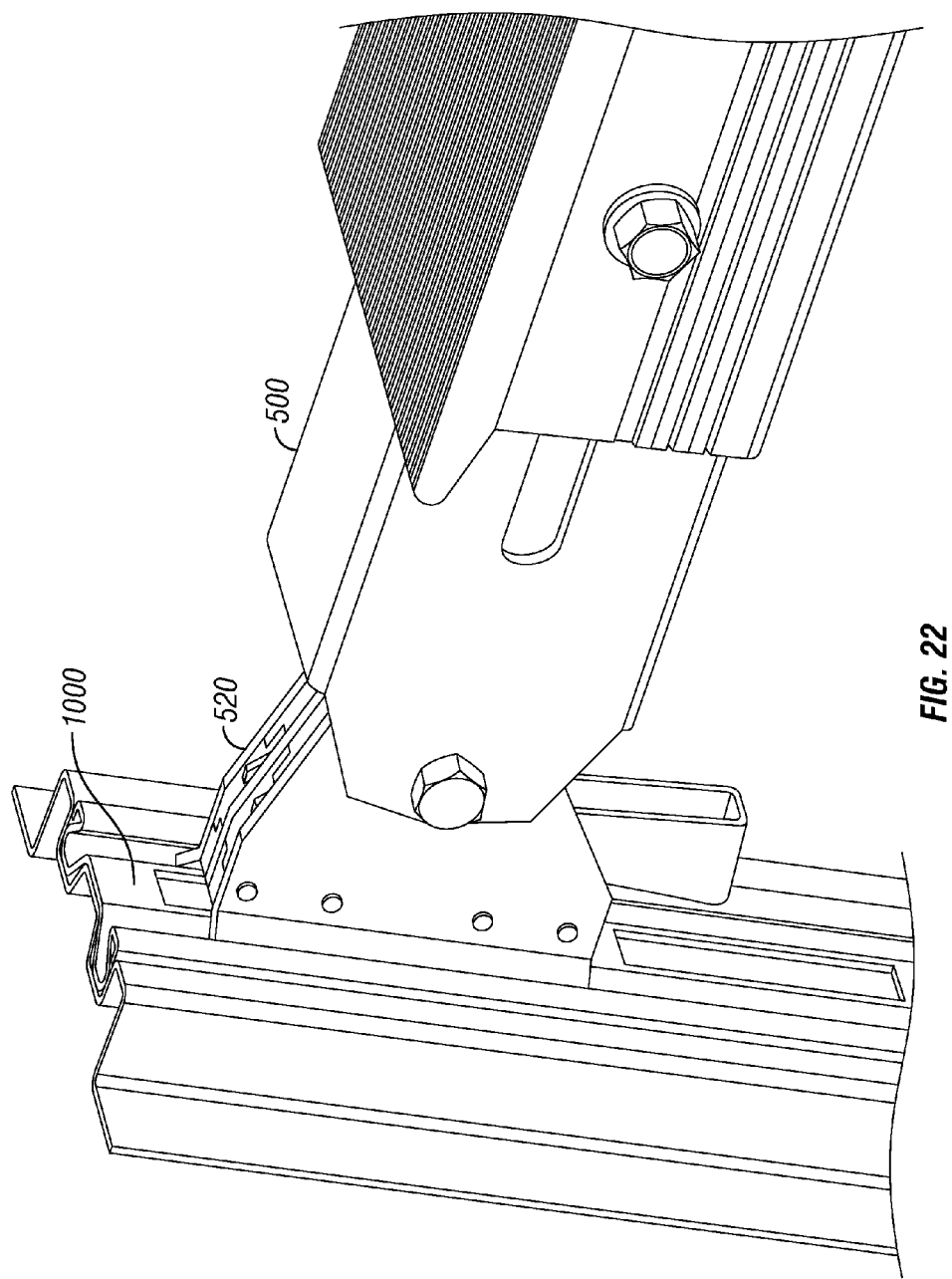
FIG. 22 is a perspective view of the sliding beam end inserted into the captive mounting post insert in accordance with the present invention.

As with the embodiments shown in FIGS. 16-20, the slider track insert 1000 is compatible with both the sliding beam end 500 and the reversible beam end 600 embodiments. FIG. 22 is a perspective view of the foot of a sliding beam end 500 with the foot section 520 inserted into the captive slider track insert 1000. FIG. 23 shows the reversible beam end 600 inserted into the captive slider track insert 1000. The examples shown in FIGS. 22 and 23 depict the beam ends inserted into A slots, but they are equally compatible with an E slot configuration in the slider track.

As with the other embodiments of the mounting post, the post 1040 and slider track insert 1000 are made of steel in a preferred embodiment.

Figure 24:
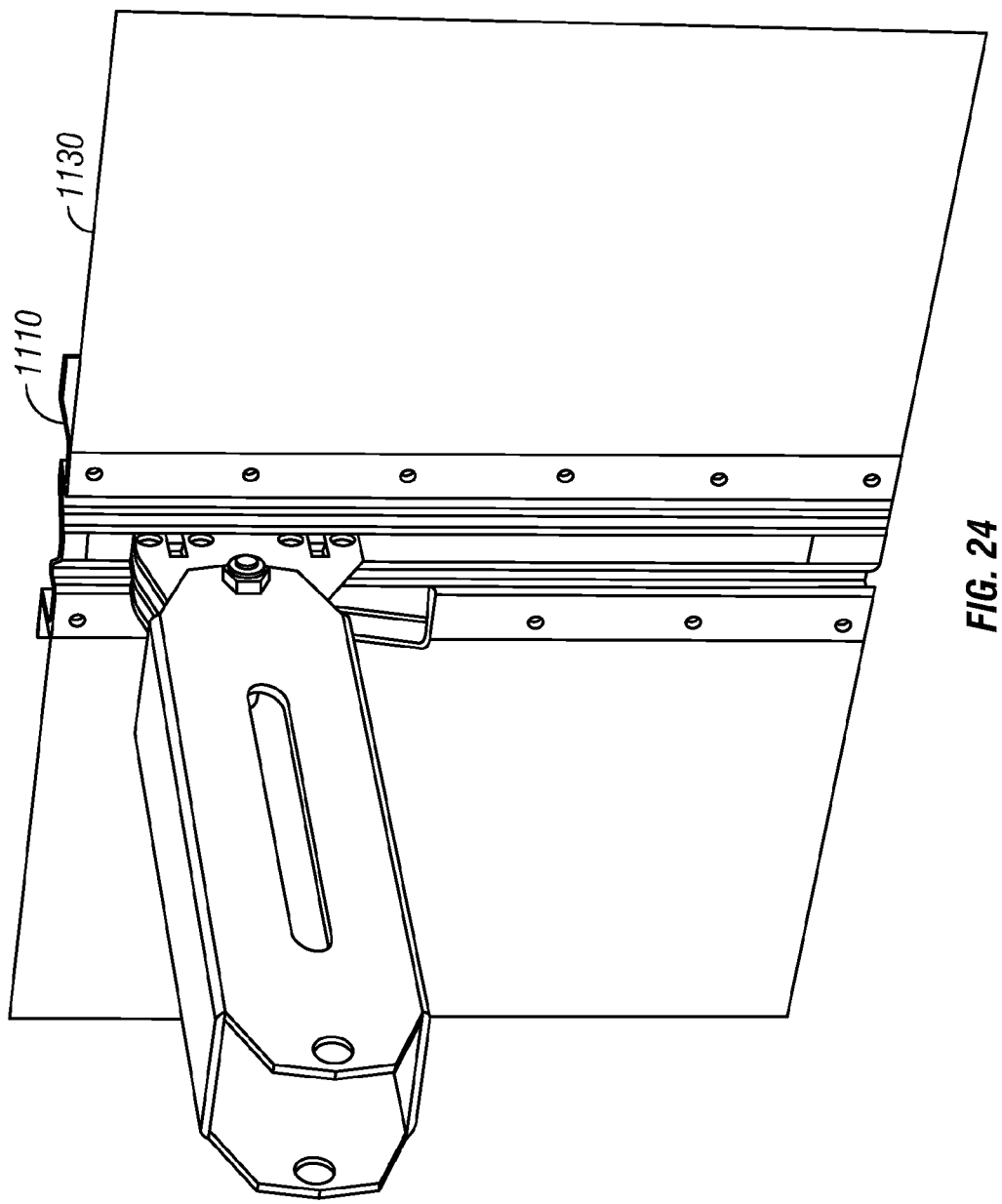
FIG. 24 is a perspective view of a slider track insert for a mounting post in accordance with an alternate embodiment of the present invention.
Figure 25:
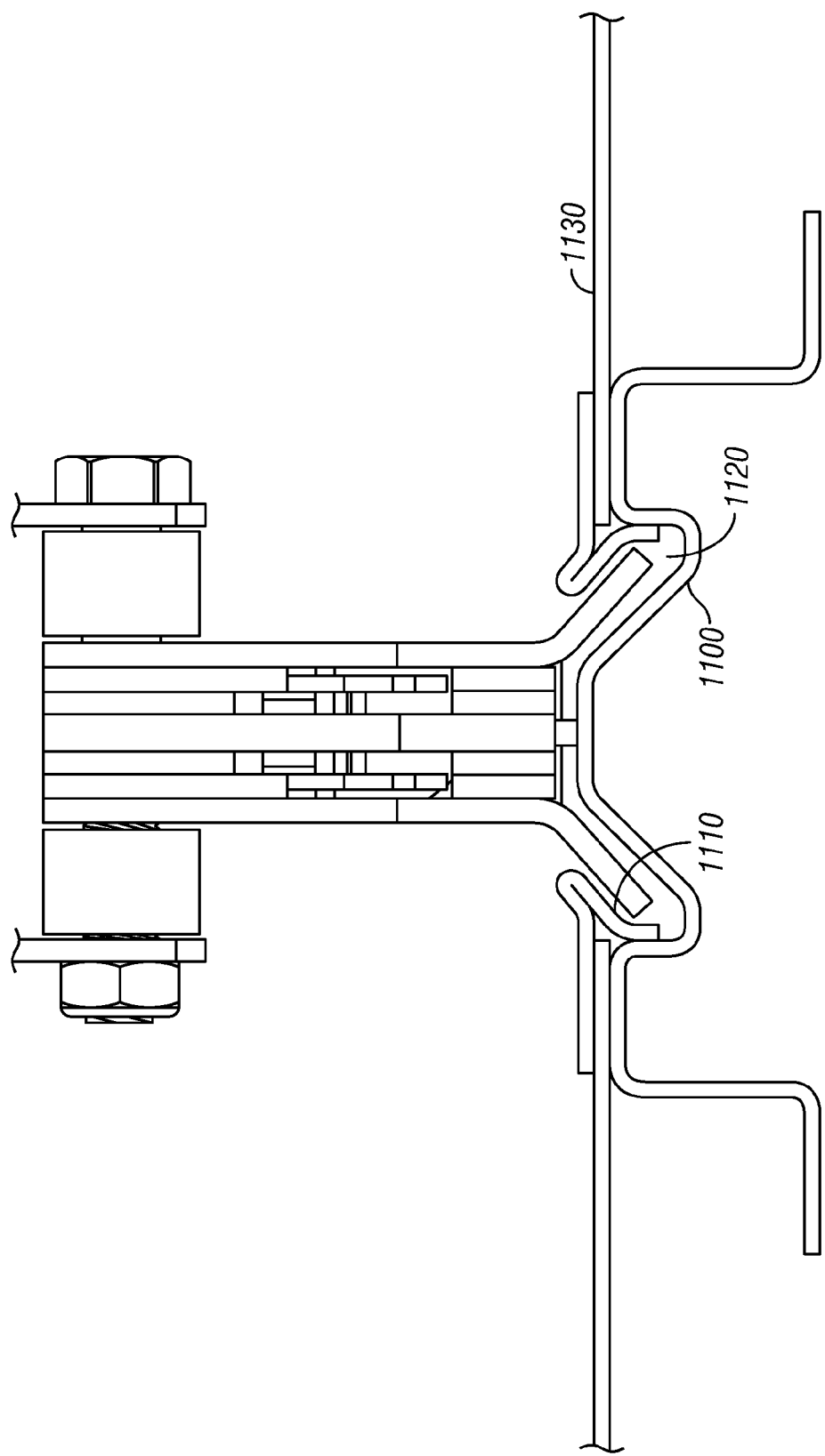
FIG. 25 is a top, cross-section view of the of the mounting post insert shown in FIG. 24.

FIG. 24 is a perspective view of a slider track insert in accordance with an alternate embodiment of the present invention. FIG. 25 is a top, cross-section view of the of the slider track insert. In this embodiment of the present invention the insert comprises two angled, outer retaining walls 1110 that are not integral with the mounting post 1100. Instead they are attached to the outer edges of the slider track to form angled guide channels 1120 as shown in the FIG. 25.

In the present example, optional wall plates 1130 are inserted between the frame of the mounting track 1100 and the angled retaining wall inserts 1110. These plates extend between adjacent mounting posts along the walls of the cargo container to produce a raised inner wall in the cargo container. The effect of this inner wall is to effectively recess the slider tracks of the mounting posts as shown in FIG. 24. These inner wall plates 1130 can also be used with any of the embodiments of the mounting tracks of the present invention to create this recessed effect.

Figure 26:
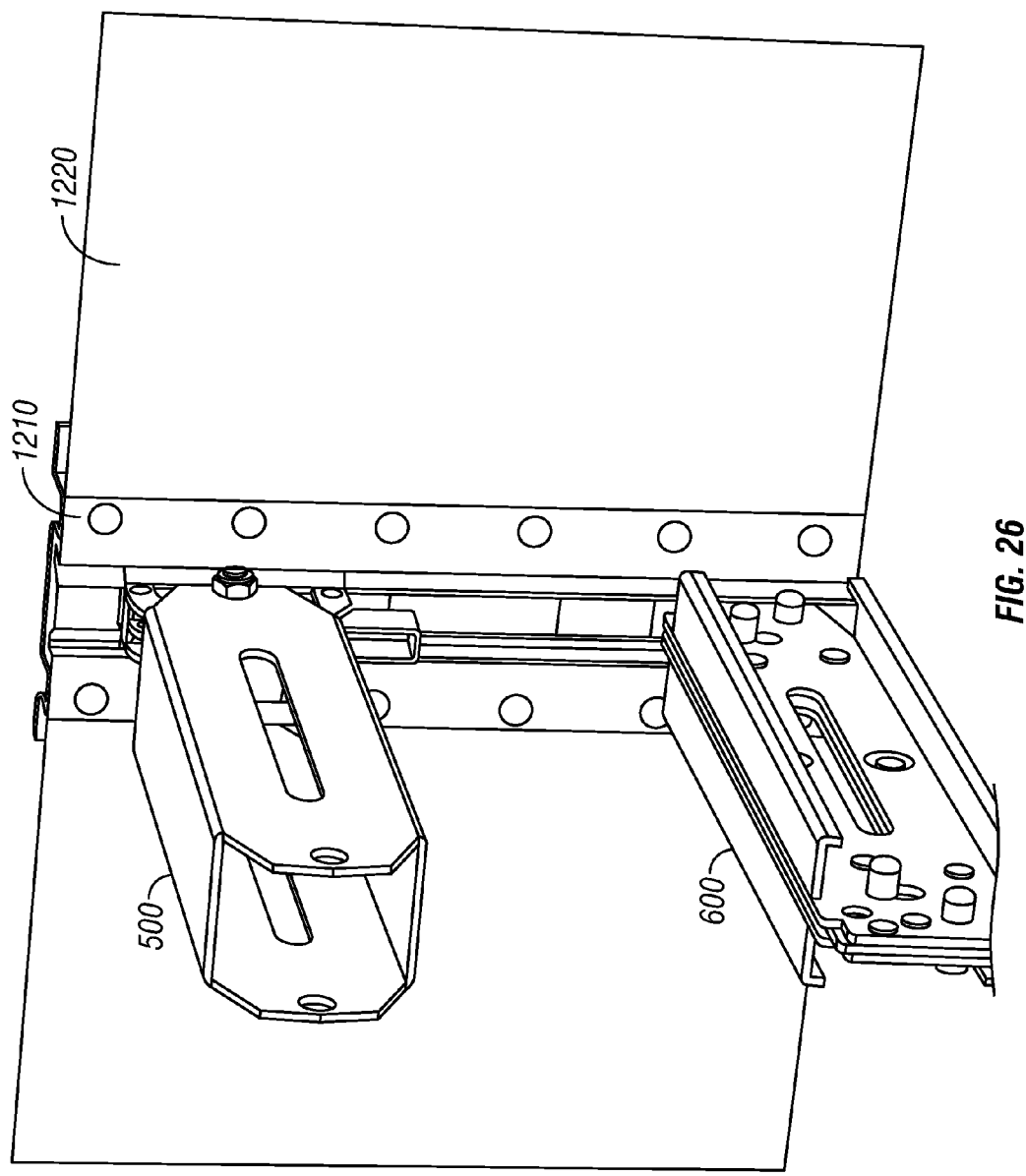
FIG. 26 is a perspective view of an alternate embodiment of the slider track insert in accordance with the present invention.
Figure 27:
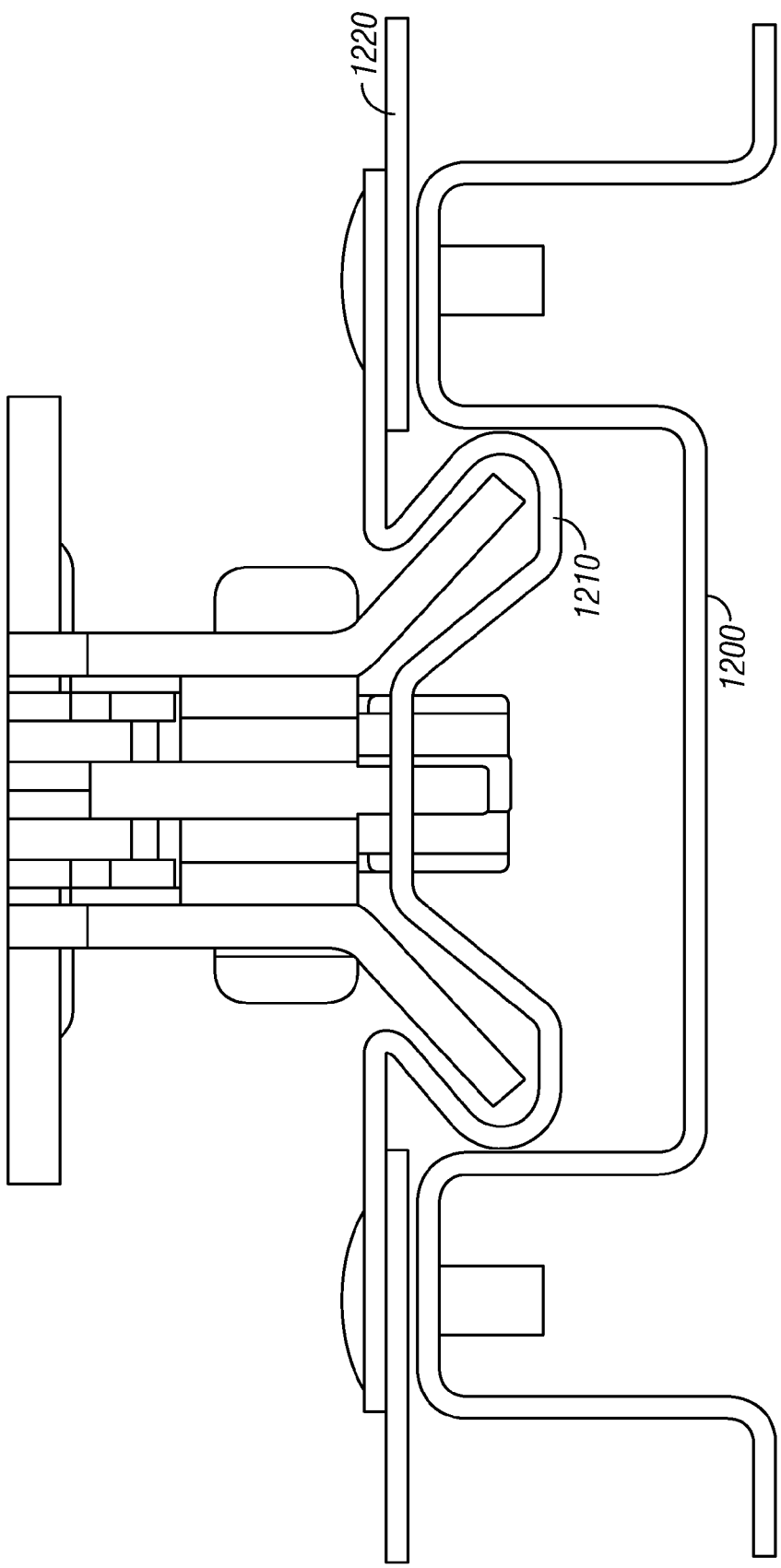
FIG. 27 is a top, cross-section view of the slider track insert shown in FIG. 26.

FIG. 26 is a perspective view of an alternate embodiment of the retrofit slider track insert in accordance with the present invention. FIG. 27 is a top, cross-section view of the slider track insert shown in FIG. 26. As shown in FIG. 26, and emphasize throughout this discussion, the slider track in the mounting post of the present invention is compatible with alternate embodiments of the beam end assembly. In the example shown, both the sliding beam end assembly 500 and the reversible beam end assembly 600 are pictured mounted in the same slider track.

As illustrated more clearly in the cross-section view of FIG. 27, the underlying mounting post 1200 does not have any angled walls or a center track to form guide channels. It is essentially an empty rectangular space. The angled retaining surfaces of the capture slider track are provided entirely by the insert 1210 as shown. Like the example shown in FIGS. 24 and 25, this embodiment also includes wall plates 1220 to produce a recessed track effect. As with the previous example, the wall plates are optional.

Figure 28:
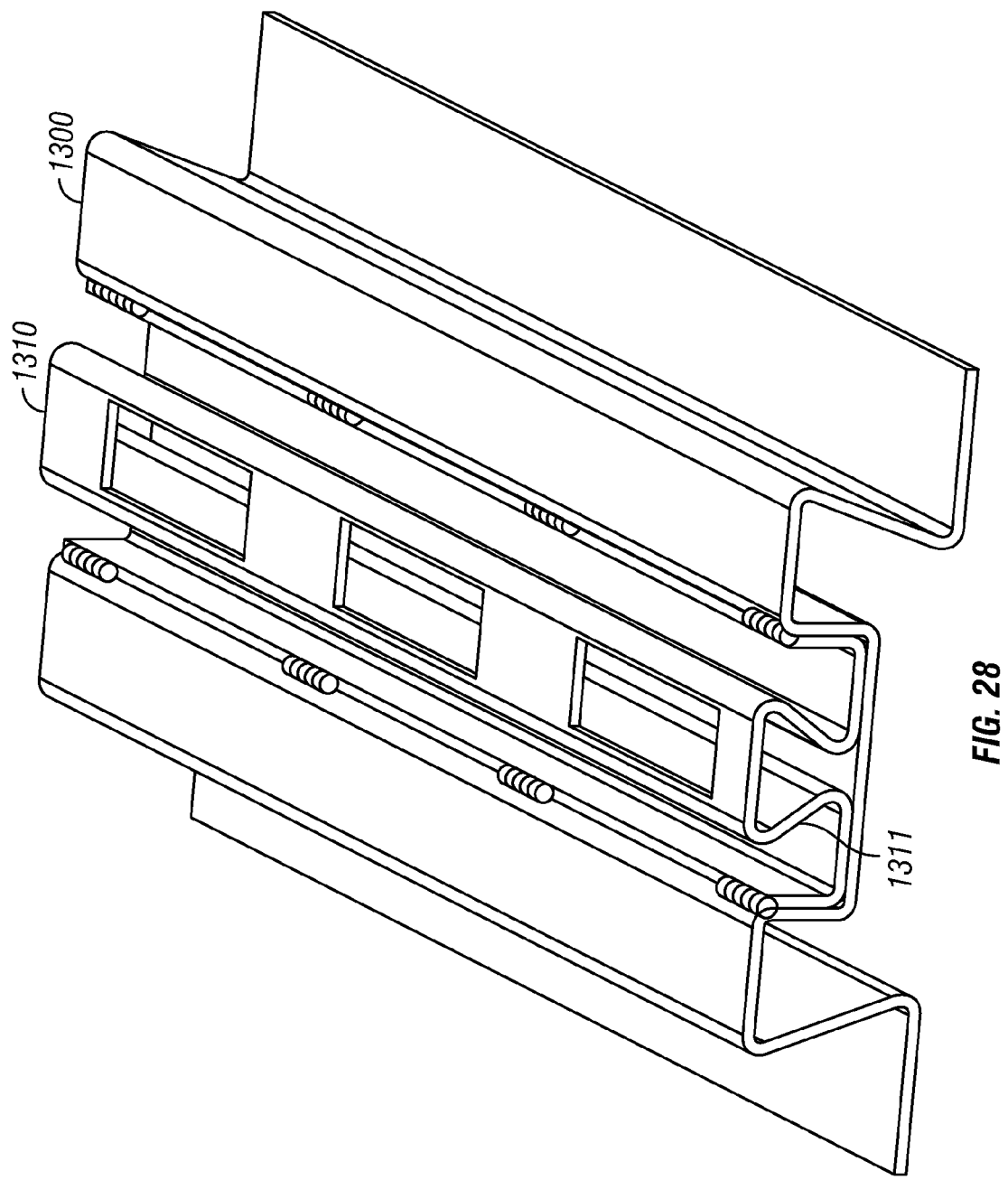
FIG. 28 is a perspective view of an alternate embodiment of a captive mounting post insert in accordance with the present invention.
Figure 29:
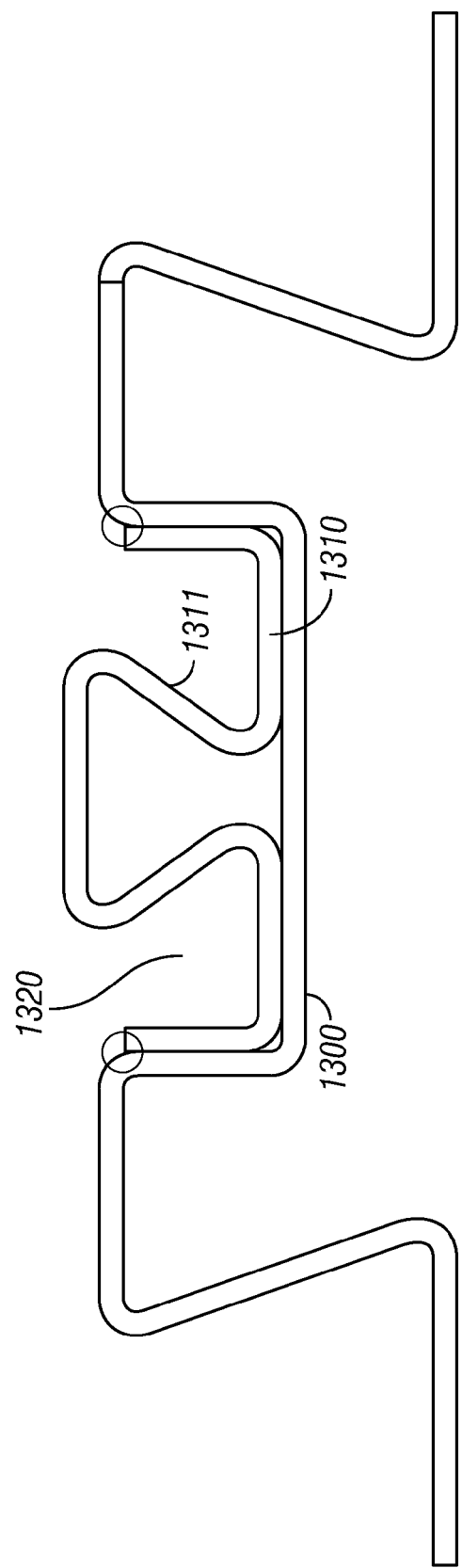
FIG. 29 is a top, cross-section view of the mounting post insert shown in FIG. 28.

FIG. 28 is a perspective view of yet another alternate embodiment of a mounting post insert in accordance with the present invention. FIG. 29 is a top, cross-section view of the mounting post insert shown in FIG. 28. As with the example shown in FIG. 27, the mounting post 1300 in this example does not have a captive slider track with angled retaining walls. Rather, the capture features are provided by the insert 1310.

In this embodiment the sides 1311 of the center track obliquely angle inward rather than outward, thereby forming inwardly sloping guide channels 1320. The mechanical advantages of this design can be appreciated with reference to FIG. 30.

Figure 30:
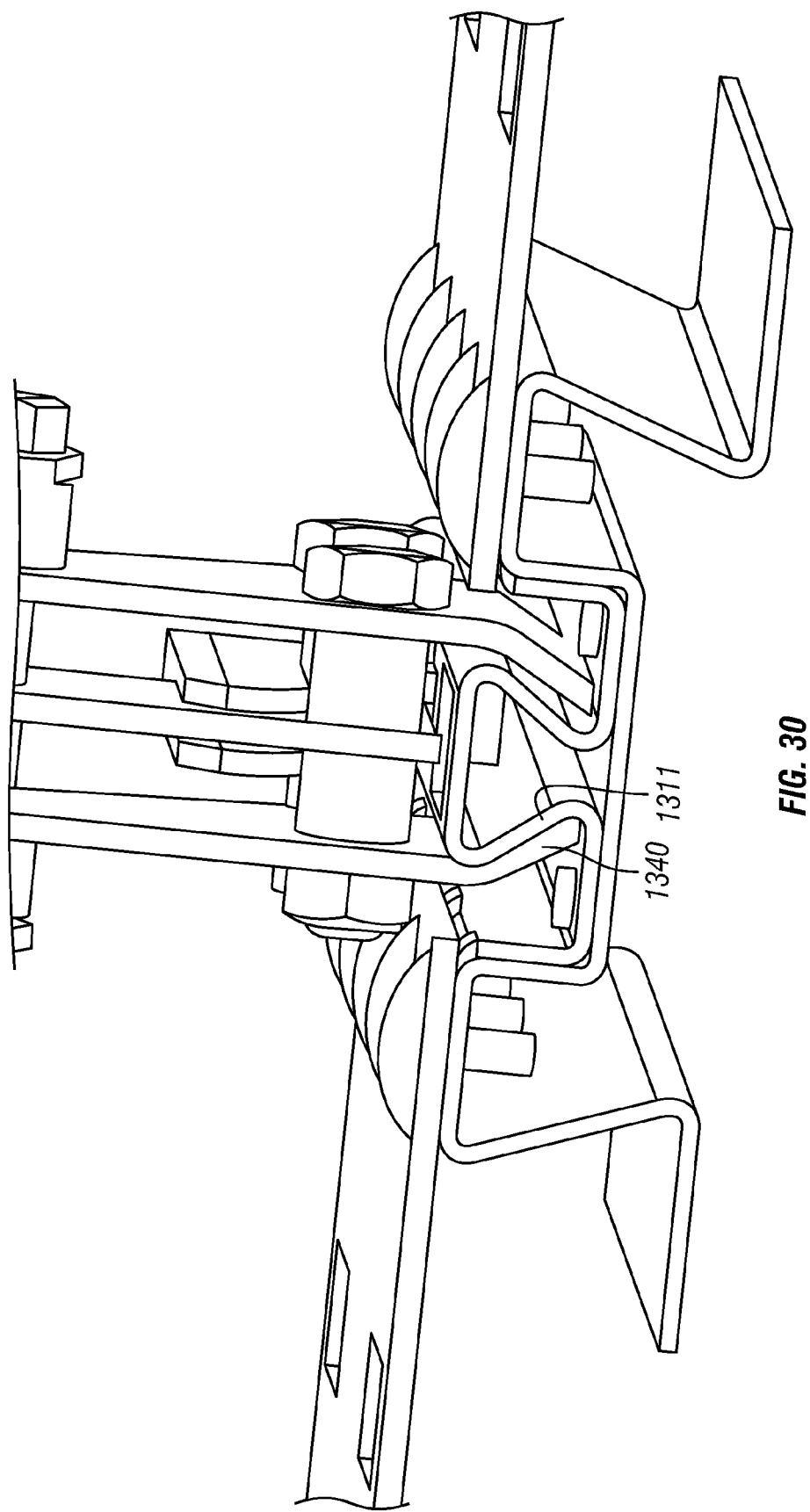
FIG. 30 is a perspective view of an alternate embodiment of the sliding beam end foot designed for use with the mounting post inserts shown in FIGS. 28 and 29.

FIG. 30 is a perspective view of an alternate embodiment of the sliding beam end foot designed for use with the mounting post inserts shown in FIGS. 28 and 29. As can be seen in the figure, the guide edges 1340 in this embodiment of the foot obliquely angle inward to match the inward slope of the center track walls 1311. This design obviates the need for the outer angled retaining walls found in the other slider track embodiments of the present invention. Because the guide edges 1340 of the foot angle inward, the retaining force is applied differently in this embodiment. Referring back to FIG. 18, when the locking plate of the foot is engaged with the mounting post, the outward angled guide edges 530 are pushed back against the angled outer retaining walls 810. In contrast, in the embodiment shown in FIG. 30, when the locking plate engages an opening in the center track, the inward angled guide edges 1340 are pulled up against the inward angled side walls 1311 of the center track, effectively pinching or gripping the center track.

As with the other embodiments of the mounting post slider track insert, the embodiment illustrated in FIGS. 28-30 can also be used with the reversible beam end embodiment of FIGS. 12-15, which can insert into the openings (either A or E slots) in the center track.

It should be emphasized that the captive slider post of the present invention is not limited to use with the beam end assemblies 500, 600 illustrated above. It is also compatible with any off-the-shelf beam or strap that is designed for industry standard A or E slots. Therefore, the slider post of the present invention works like a standard logistic post in addition to a slider track for the adjustable decking system, with no need for different end fittings or additional tracks as with prior art mounting posts.

The captive beam system of the present invention allows the user to store decking beams in the ceiling of the trailer or container when not in use. Prior arts systems must insert an additional aluminum track into a conventional mounting post or use a separate aluminum post for this function. In contrast, the present invention uses a multipurpose side post as described above. The multipurpose post of the present invention serves as a support member in the sidewall, a logistic post, and a slider track when the beam channel assembly is inserted into the track, forming an adjustable decking system.

Figure 31:
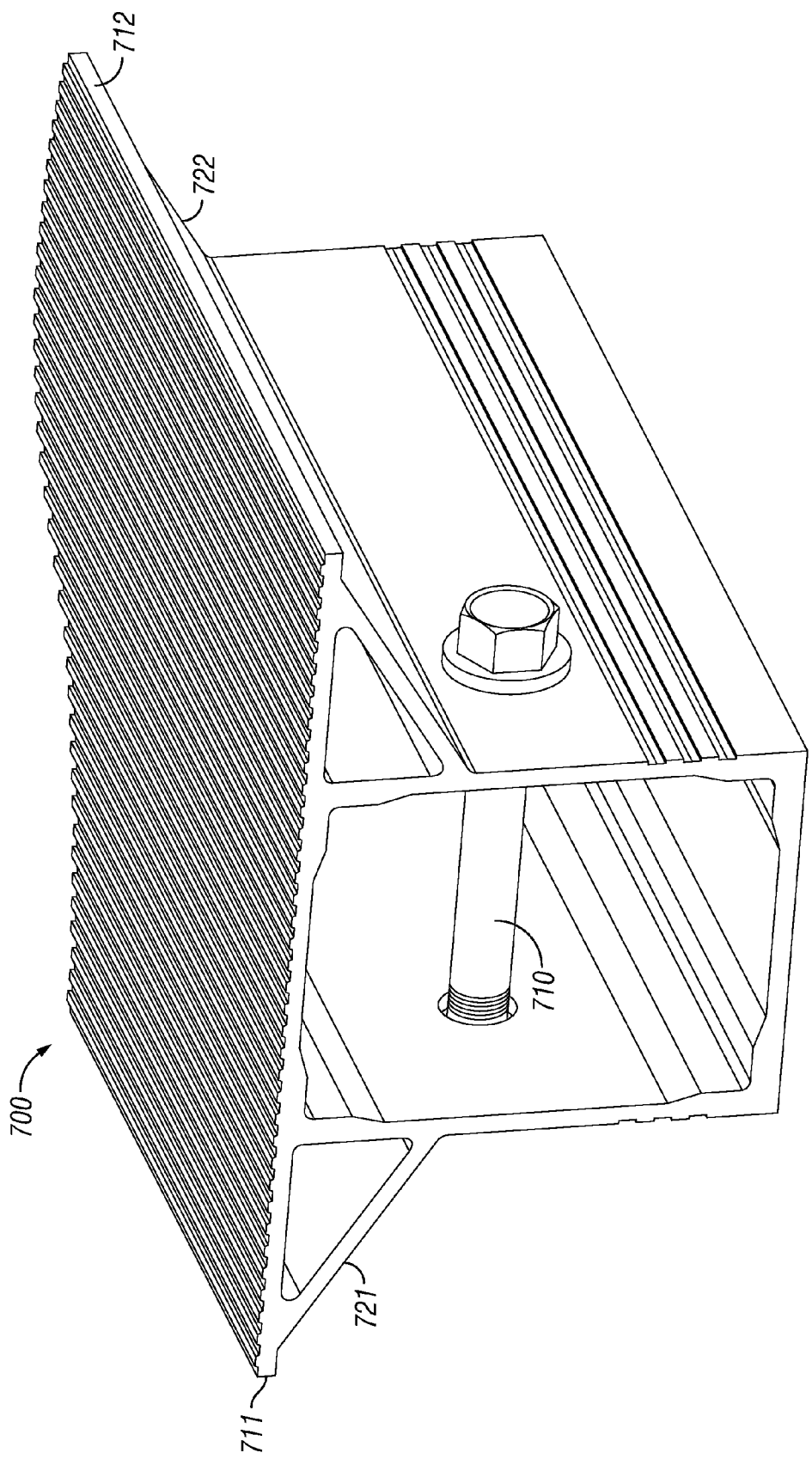
FIG. 31 is a perspective view of a wide-top decking beam in accordance with the present invention.
Figure 32:
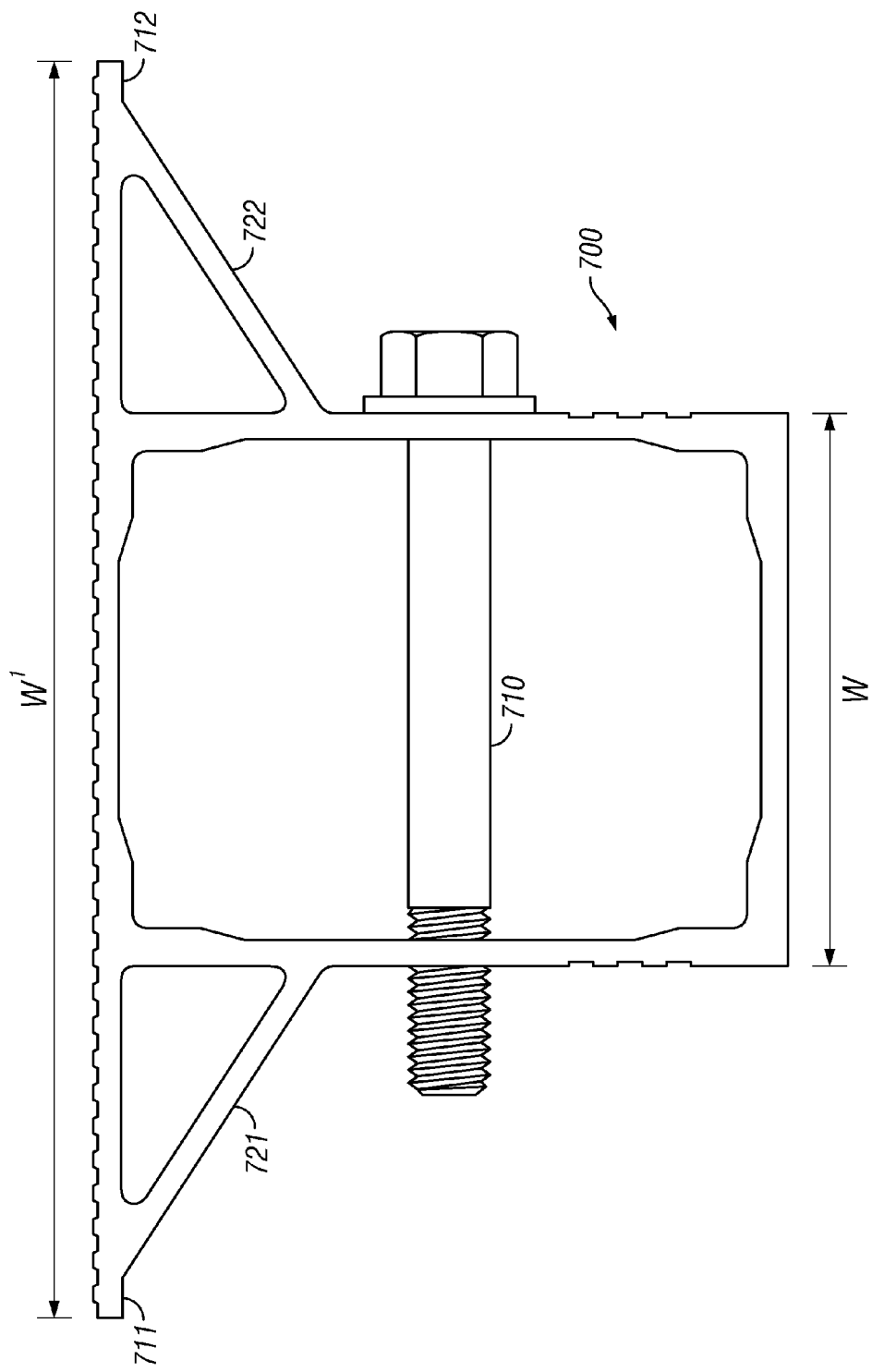
FIG. 32 is an end on, cross-sectional view of the wide-top decking beam.

FIG. 31 is a perspective view of a wide-top decking beam in accordance with the present invention. FIG. 32 is an end on, cross-sectional view of the wide-top decking beam. In addition to providing improved beam end and mounting post embodiments as described above, the present invention also provides an improved decking beam 700 itself.

The top of the beam 700 has a width W' that is greater than the width W of the bottom of the beam. This increased width W' provides greater surface area on which cargo payloads can be placed, providing additional stability to the load. It also distributes the load over a greater area, reducing the likelihood of the beam cutting into the payload. The extended flanged edges 711, 712 of the beam top can also protect the side of the beam 700 against impact, which can often occur during the loading of cargo payloads.

An advantage of the decking beam of the present invention over prior arts designs is the increased strength of the flanged edges 711, 712 on the top surface of the beam. As discussed above, the extended beam edges found in the prior art are vulnerable to damage from impact. Much of this has to do with the geometry of the beam designs and likely impact force vectors from dropped or mishandled payloads.

As shown in FIGS. 31 and 32, the decking beam of the present invention includes obliquely angled struts 721, 722 along its length that reinforce the flanged edges 711, 712 of the top surface. Along with the sides of the beam and flanged edges, the struts 721, 722 form triangular trusses along the length of the beam. This triangular shape gives the extended beam top greater strength than prior art designs.

The triangle is the only two dimensional polygon that, if constructed of rigid members, is absolutely fixed in shape up to the compressive and tensile limits of its members. A square, by contrast (see elements 90, 100 illustrated in FIG. 3), can be misshapen into a parallelogram. Unlike other polygons, triangles do not change shape without a change in the length of one of their sides. This inherent strength forms the basis for the widespread use of triangles in architecture.

Figure 3:
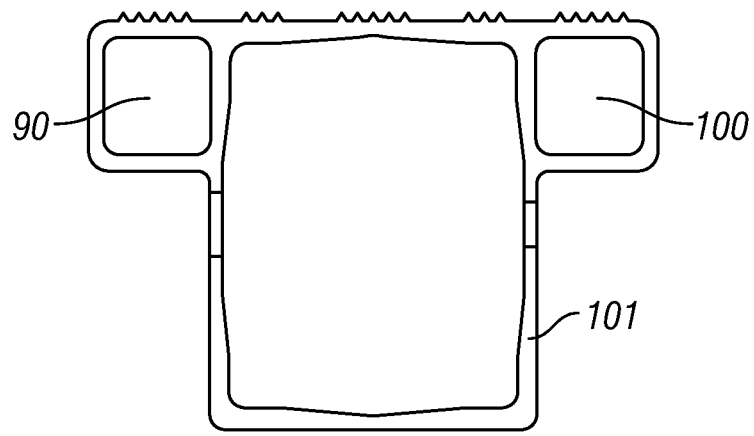
FIG. 3 is a cross-sectional view of a decking beam with a wider top width than bottom width in accordance with the prior art.
Figure 4:
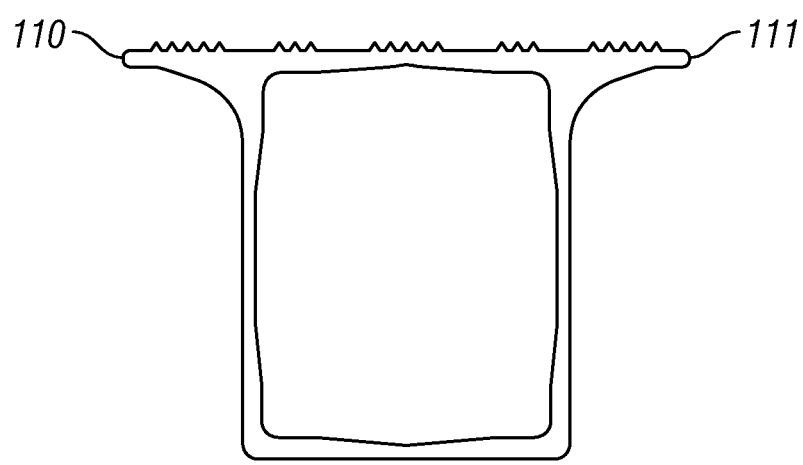
FIG. 4 is a cross-sectional view of an alternate decking beam with a wider top width than bottom width in accordance with the prior art.

Given the same materials, the triangular cross section provided by the struts 721, 722 in the wide-top decking beam of the present invention provides inherently greater structural strength than the T-shaped designs shown in FIGS. 3 and 4.

Figure 33:
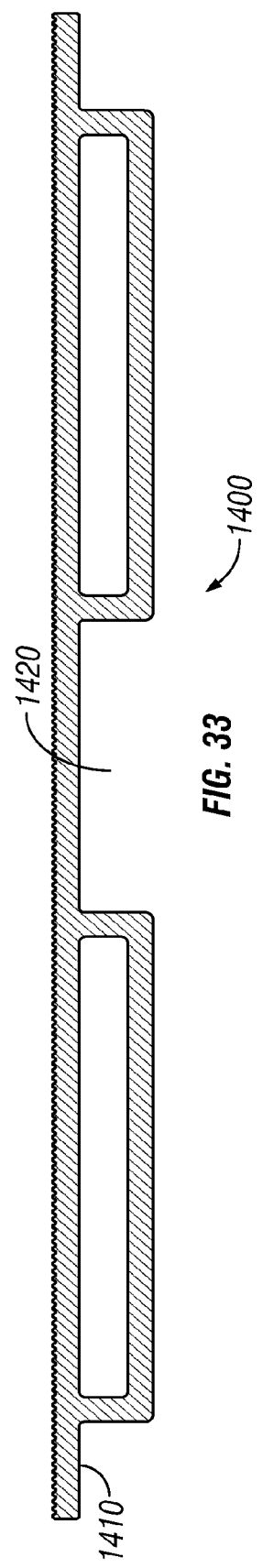
FIG. 33 is a cross section view of an inter-beam decking bridge in accordance with the present invention.

FIG. 33 shows a cross-section view of an inter-beam decking bridge in accordance with the present invention. The bridge 1400 is designed to fit between two adjacent decking beams to form a solid deck or second floor and can be made of plastic or composite material. Each side of the bridge 1400 has a flanged lip 1410 long enough to rest across half the width of the top of a decking beam, leaving the other half of the decking beam top surface free. This allows an adjacent bridge to be placed on the other half of the beam to extend the flooring as needed.

The bridge 1400 has a recess 1420 in the center sized to fit on top of a single decking beam for storage when not in use and the beam is stored at the top of the cargo container as described above. The beams and bridge are brought down one at a time as needed.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A beam end assembly, comprising:
   (a) a body configured to be slidably disposed within an end of a beam member; and
   (b) a foot section pivotally coupled to the body, wherein the foot section further comprises:
      (i) obliquely angled guide edges formed from outer plates of the foot section, wherein said guide edges are configured to be slidably captured within similarly angled guide channels in a mounting post; and
      (ii) a pivoting locking plate sandwiched between said outer plates, wherein the locking plate is configured to slide into and out of openings in said mounting post to secure the beam end assembly in place on the mounting post.

2. The beam end assembly according to claim 1, wherein the guide edges angle outward.

3. The beam end assembly according to claim 1, wherein the guide edges angle inward.

4. The beam end assembly according to claim 1, further comprising a locking arm that comprises a U-shaped arm that flanks the sides of the locking plate.

5. The beam end assembly according to claim 1, wherein the foot section further comprises a center plate with a recess configured to accommodate the locking plate.

6. The beam end assembly according to claim 5, wherein the foot section further comprises spacer plates between the outer plates and center plate, wherein the spacer plates define a path of movement for the pivoting locking plate.

7. The beam end assembly according to claim 1, wherein the foot section is made of steel.

8. The beam end assembly according to claim 1, where in the locking plate is configured to fit within both "A" and "E" openings in mounting posts.

* * * * *